US011609682B2

(12) United States Patent
Skuratowicz et al.

(10) Patent No.: US 11,609,682 B2
(45) Date of Patent: Mar. 21, 2023

(54) METHODS AND SYSTEMS FOR PROVIDING A COMMUNICATION INTERFACE TO OPERATE IN 2D AND 3D MODES

(71) Applicant: Verizon Patent and Licensing Inc., Basking Ridge, NJ (US)

(72) Inventors: David Skuratowicz, Felton, CA (US); Alagu Periyannan, Palo Alto, CA (US); Mohammad Raheel Khalid, Budd Lake, NJ (US); Selina Hu, Seattle, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/219,540

(22) Filed: Mar. 31, 2021

(65) Prior Publication Data
US 2022/0317830 A1    Oct. 6, 2022

(51) Int. Cl.
*G06F 3/0482* (2013.01)
*G06Q 10/10* (2012.01)
*H04L 12/18* (2006.01)
*G06F 3/04815* (2022.01)

(52) U.S. Cl.
CPC ........ *G06F 3/0482* (2013.01); *G06F 3/04815* (2013.01); *G06Q 10/10* (2013.01); *H04L 12/1813* (2013.01); *G06T 2219/024* (2013.01)

(58) Field of Classification Search
CPC ......... G06F 3/048; G06Q 10/10; H04L 12/18; G06T 2219/024; G06T 19/20
See application file for complete search history.

(56) References Cited

U.S. PATENT DOCUMENTS

| 8,191,001 | B2* | 5/2012 | Van Wie | ................. G06T 19/20 707/726 |
| 2010/0251119 | A1* | 9/2010 | Geppert | ................. H04L 65/403 715/716 |
| 2011/0216059 | A1* | 9/2011 | Espiritu | ................. G06T 19/00 345/419 |
| 2014/0095223 | A1* | 4/2014 | Oxenham | ............. G06Q 10/02 705/5 |
| 2014/0210857 | A1* | 7/2014 | Liu | ......................... G06T 7/246 345/633 |
| 2017/0053447 | A1* | 2/2017 | Chen | ........................ G06T 15/20 |
| 2020/0142942 | A1* | 5/2020 | Peri | ...................... H04L 65/1069 |
| 2021/0201588 | A1* | 7/2021 | Yerli | ..................... G06Q 10/107 |

* cited by examiner

*Primary Examiner* — Jennifer N Welch
*Assistant Examiner* — Qi Wan

(57) ABSTRACT

An illustrative communication provider system presents, to a first user, a communication interface that displays a two-dimensional ("2D") representation of a shared virtual space that includes a 2D representation of an avatar associated with a second user. By way of the communication interface, the communication provider system receives a request by the first user to initiate a communication session of a particular communication type with the second user, and, based on the request, initiates the communication session of the particular communication type with the second user. During the initiated communication session and based on the particular communication type, the communication provider system replaces the 2D representation of the shared virtual space with a three-dimensional ("3D") representation of the shared virtual space that includes a 3D representation of the avatar associated with the second user. Corresponding methods and systems are also disclosed.

20 Claims, 12 Drawing Sheets

METHODS AND SYSTEMS FOR PROVIDING A COMMUNICATION INTERFACE TO OPERATE IN 2D AND 3D MODES

BACKGROUND INFORMATION

The combination of various conditions and events in recent years has created a demand for ever more effective, convenient, and flexible ways of facilitating communication between people who are located remotely from one another. As one example, a global pandemic and other factors have driven a dramatic increase in the number of people who perform some or all their work from home or other convenient locations rather than from a physical office space or other shared physical space.

Many positive consequences have attended these increases in remote communication and telecommuting. For example, office workers may, in many ways, be more comfortable working from home than in an office, and may use time previously reserved for commuting as additional work time or free time, thereby increasing their efficiency and/or sense of morale and work-life balance. Unfortunately, along with these gains in efficiency and morale that have resulted from remote working trends, certain communication challenges have also presented themselves. For example, remote speakers communicating in conventional ways (e.g., phone calls, video conferencing, etc.) may lose certain aspects of in-person communication such as certain non-verbal cues, collaborative aspects involving objects (e.g., whiteboarding on a shared drawing surface, object or situational modeling using physical blocks or other objects, etc.), and so forth.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

DETAILED DESCRIPTION OF EXAMPLE EMBODIMENTS

Figure 1:
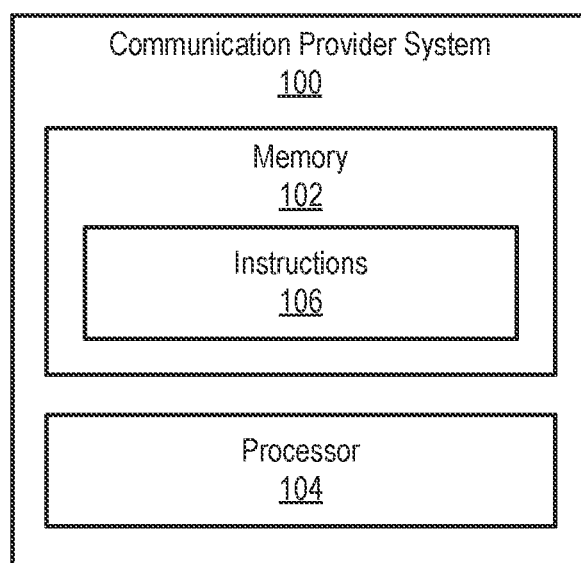
FIG. 1 shows an illustrative communication provider system configured to provide a communication interface to operate in two-dimensional ("2D") and three-dimensional ("3D") modes in accordance with principles described herein.

Methods and systems for providing a communication interface to operate in two-dimensional ("2D") and three-dimensional ("3D") modes are described herein. As mentioned above, certain challenges have presented themselves alongside the various advantages of increased remote communication trends. For instance, when coworkers are unable to work together in person, certain types of communication and collaboration may decrease, including collaborative strategic development and/or problem-solving using shared drawing surfaces (e.g., whiteboards, etc.), development and/or modeling of ideas and concepts using physical objects or extensive body language (e.g., body language not fully or easily represented within 2D space of a conventional video call, etc.), utilization of 3D space to demonstrate spatial phenomena and/or experiences, and so forth. Some organizations (e.g., companies, firms, practices, non-profits, etc.) are discovering that, over time, these challenges can take a toll on innovation and/or social capital within the organization. For instance, these challenges may limit effective teamwork, collaborative problem-solving, development of effective strategies, and/or other desirable outcomes, and may lead to a counterproductive sense of meeting fatigue and lack of workplace camaraderie.

Systems and methods described herein for providing a communication interface to operate in 2D and 3D modes address these challenges and improve these outcomes in various ways. For instance, under circumstances in which conventional types of remote communication (e.g., textual messaging, voice/video calls, voice/video conferencing, etc.) provide adequate communication for users, communication interfaces described herein may operate in a 2D mode that facilitates these types of communication in novel and configurable ways that will be described. For example, a top view or isometric view of a shared virtual space may be provided to give users a sense of location and spatial continuity as they move and converse within the shared virtual space. In the 2D mode, users may be enabled to visually search for and connect in real-time with co-workers based on department, programs, communication hierarchy, and/or other attributes. Additionally, users may create or join working clusters (e.g., virtual areas of a shared virtual space) that center around particular projects, shared interests, or other commonalities between users. Within shared virtual spaces, users may freely come and go in a natural manner similar to a physical space.

Under other circumstances in which conventional communication types are inadequate or suboptimal (e.g., when more advanced collaborative communication such as described above would be desirable), communication interfaces described herein may switch from operating in the 2D mode to operating in a 3D mode. For example, as will be described in more detail below, elements of the 3D mode may be manually and/or automatically interchangeable with elements of the 2D mode within the same communication interface, and may employ extended reality technologies (e.g., virtual reality technologies, mixed or augmented reality technologies, etc.) to provide a more immersive and realistic communication experience for the users. Additionally, the 3D mode may also facilitate advanced communication that would be inconvenient, difficult, or impossible within the 2D mode. For instance, the 3D mode may accommodate advanced communication in which shared drawing surfaces or other physical objects (e.g., modeling blocks, etc.) are relied upon, extensive body language is used, movement in 3D space is taken advantage of, or the like. Moreover, along with these benefits and advantages, users may post and/or view sticky notes, visual designs, flowcharts, and even 3D sculptures within the shared virtual space to further spark innovation and collaboration and/or otherwise increase the efficiency and effectiveness of the shared space.

Shared virtual office spaces of organizations like companies or firms provide a convenient illustrative use case for the types of spaces where systems and methods described herein may be highly effective and helpful. However, it will be understood that principles described herein may also be applied to various other types of shared virtual spaces for various other types of use cases as may serve a particular implementation. For example, such spaces and applications may include entertainment spaces (e.g., a virtual theater for screening a movie for a virtual film festival, a virtual sports box for watching a sporting event with friends, etc.), virtual convention venues (e.g., virtual spaces configured to host large-scale conferences, forums, trade shows, rallies, or other conventions, etc.), spaces configured with games and/or other interactive events (e.g., used for hosting family or class reunions, virtual birthday parties, etc.), and/or any other shared virtual spaces as may serve a particular implementation.

Additional use cases that may be served by systems and methods described herein may relate to applications such as control room applications (e.g., used during and after an event to oversee the event and make sure it goes as planned), health care applications (e.g., to help patients move through prescribed steps during a visit such as checking in, talking to the doctor, checking out, etc.), help desk applications (e.g., allowing people to virtually walk up to a virtual information technology ("IT") help desk or corporate security desk), education applications (e.g., used to support study groups, labs and higher education classes, etc.), team building applications, hybrid applications (e.g., in which users in a physical office space interact with remote users not in the physical office space), human resources applications (e.g., to facilitate employee onboarding, recruiting, compensation negotiations, etc.), and/or any other applications as may serve a particular implementation.

Various specific implementations will now be described in detail with reference to the figures. It will be understood that the specific implementations described below are provided as non-limiting examples of how various novel and inventive principles may be applied in various situations. Additionally, it will be understood that other examples not explicitly described herein may also be captured by the scope of the claims set forth below. Methods and systems described herein for providing a communication interface to operate in 2D and 3D modes may provide any of the benefits mentioned above, as well as various additional and/or alternative benefits that will be described and/or made apparent below.

FIG. 1 shows an illustrative communication provider system 100 ("system 100") configured to provide a communication interface to operate in 2D and 3D modes in accordance with principles described herein. System 100 may be implemented by computer resources such as processors, memory facilities, storage facilities, communication interfaces, and so forth. In some examples, system 100 may be implemented by user equipment (UE) devices such as personal computers, mobile devices, communication devices, or other equipment used directly by end users. Additionally or alternatively, certain or all aspects of system 100 may be implemented by computing systems that are not directly used by users, such as data servers configured to provide communication services, distributed computing systems operated by a communications provider (e.g., multi-access edge computing (MEC) servers), distributed computing systems operated by a cloud-computing provider (e.g., multi-access cloud servers), or other suitable computing systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with providing a communication interface to operate in 2D and 3D modes as described herein and/or as may serve a particular implementation.

Figure 2:
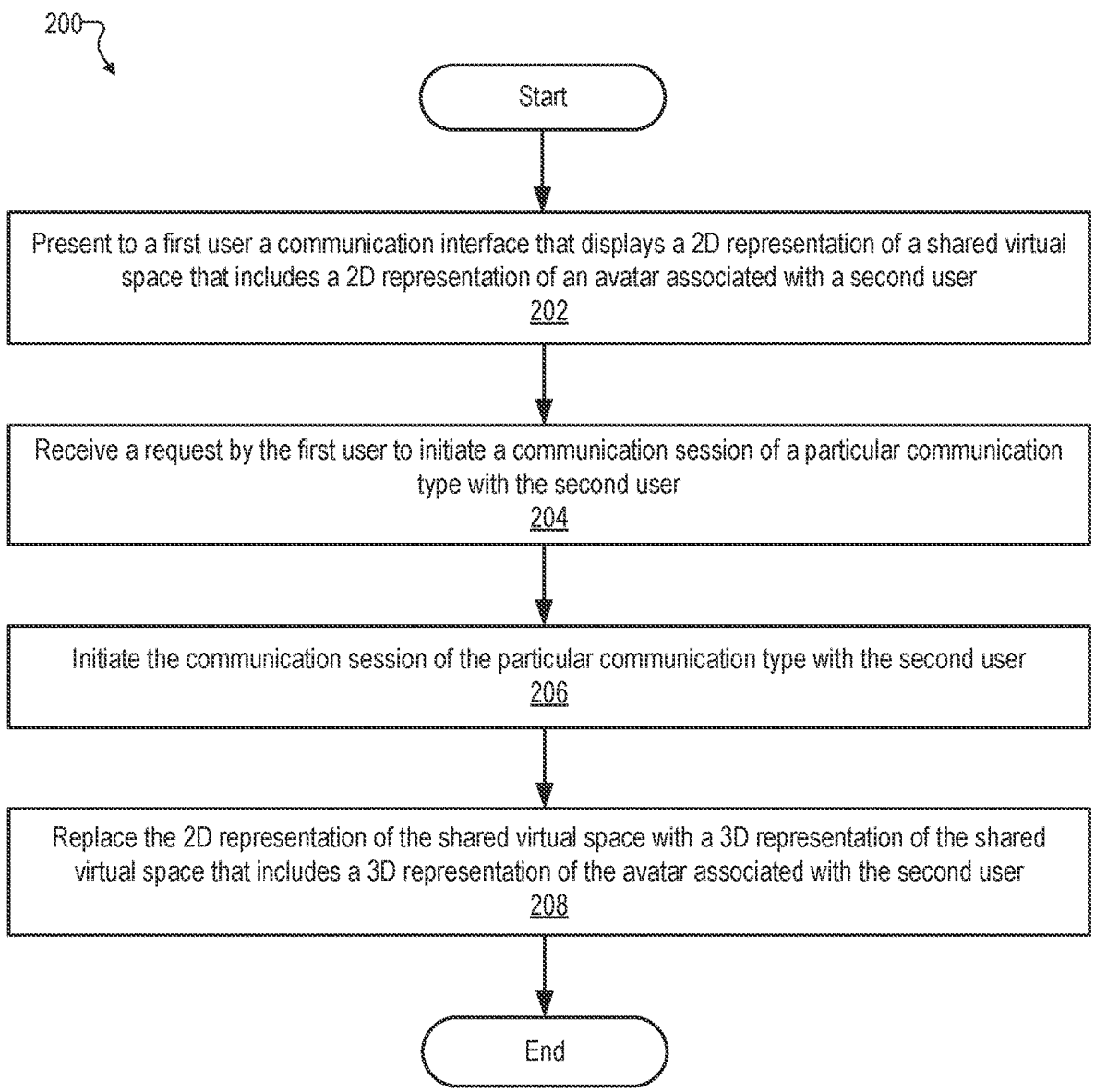
FIG. 2 shows an illustrative method for providing a communication interface to operate in 2D and 3D modes in accordance with principles described herein.

As one example of functionality that processor 104 may perform, FIG. 2 shows an illustrative method 200 for providing a communication interface to operate in 2D and 3D modes in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a communication provider system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-208 of method 200 will now be described in more detail as the operations may be performed by system 100 (e.g., by processor 104 as processor 104 executes instructions 106 stored in memory 102).

At operation 202, system 100 may present a communication interface to a first user. The communication interface may display a 2D representation of a shared virtual space that includes respective 2D representations of one or more avatars. The shared virtual space may be implemented as a virtual office space or another suitable virtual space (e.g., including any of the virtual spaces configured to support any of the applications or use cases mentioned herein) that is shared by a plurality of users represented by avatars within the virtual space. For example, one avatar included within the shared virtual space may be an avatar associated with the first user, and another may be an avatar associated with a second user located remotely from the first user (e.g., both users located in their respective homes and both telecommuting to a virtual office, one user in a physical office space and the other telecommuting from home, etc.).

By way of the communication interface presented at operation 202, the first user may not only be able to ascertain whether the second user is online, available to communicate, etc., but also may see the virtual location of the second user (based on the virtual location of the avatar representing the second user) within the shared virtual space. For example, the second user may be virtually located within his or her virtual workspace (in which case the first user may decide to temporarily abstain from communicating so as not to interrupt the workflow of the second user), within a virtual break room or in the workspace of another user (in which case the first user may decide it is a good time to communicate with the second user), or in another virtual location within the shared virtual space. Examples of 2D representations of shared virtual spaces and avatars will be illustrated and described in more detail below.

At operation 204, system 100 may receive a request by the first user to initiate a communication session of a particular communication type with the second user. The request may be received by way of the communication interface in any of the ways described herein. For example, the first user may originate the request by selecting (e.g., clicking on) the avatar of the second user and choosing a particular communication option from a menu of communication options that is presented to correspond to different communication types that may be used to communicate with the second user. A menu including various communication options that may facilitate the first user in making the request will be illustrated and described in more detail below.

At operation 206, system 100 may initiate the communication session based on the request received at operation 204. Specifically, system 100 may initiate a communication session of the particular communication type between the first user and the second user. In some examples, the particular communication type requested by the first user may comport well with the 2D representation of the shared virtual space being displayed in the communication interface. For instance, in certain implementations and/or scenarios, system 100 may be configured to present a textual messaging exchange (e.g., an instant messaging exchange, a text chat, an SMS or MMS messaging exchange, etc.) or an audio-only phone call (i.e., a voice call) within the 2D representation of the shared virtual space by, for example, initiating a dialog box for the messaging exchange, initiating a communication channel for the call, or the like. Additionally, certain implementations of systems and methods described herein may support impromptu communications in which users may converse outside of any formal communication session. For instance, one user may simply begin to speak (without any formal initiation of a communication session) and the voice communication may be delivered to a second user in a virtual proximity of the first user if the second user has an availability status that allows for such impromptu communications. As with the communication sessions described above, these impromptu communications may also comport well with the 2D representation of the shared virtual space.

In other examples, however, the particular communication type requested by the first user may not be optimally served by the 2D representation of the shared virtual space. For example, in certain implementations and/or scenarios, system 100 may be configured to present an extended reality communication session (e.g., a communication session in which users converse in a manner replicating in-person communication including by using virtual objects such as shared drawing surfaces) within a 3D representation of the shared virtual space.

Accordingly, at operation 208, system 100 may replace the 2D representation of the shared virtual space with a 3D representation of the shared virtual space. Operation 208 may be performed during the communication session initiated at operation 206 (e.g., throughout the duration of the communication session, for a portion of the time that the communication session is ongoing, etc.) and may be performed based on the particular communication type (e.g., as a result of the particular communication type being an extended reality communication type or other communication type of the latter variety described above that is to be presented in 3D). Just as the 2D representation of the shared virtual space includes the 2D representation of the avatar associated with the second user, the 3D representation that replaces the 2D representation at operation 208 may include a 3D representation of the avatar associated with the second user. For example, as will be illustrated and described in more detail below, the 3D representation of the avatar may take a human form and may even be configured to display a likeness of the second user himself or herself, so as to immersively simulate for the first user an in-person communication session with the second user.

The 3D representation replacing the 2D representation at operation 208 may be displayed within the communication interface in the same place (e.g., within the same window or pane of a communication portal) as the 2D representation was previously displayed. Additionally, in connection with the displaying of the 3D representation on a display screen (e.g., a computer monitor, etc.), the 3D representation may further be presented to the first user by way of an extended reality presentation device (e.g., a head-mounted device) such that, if the first user puts on the device, the first user may experience the 3D representation in a natural and immersive way using extended reality technology. For instance, the first user may direct the field of view presented in the extended reality presentation device by turning his or her head to look around the room, hear audio as it is simulated to propagate within the virtual 3D space, and so forth.

Figure 3:
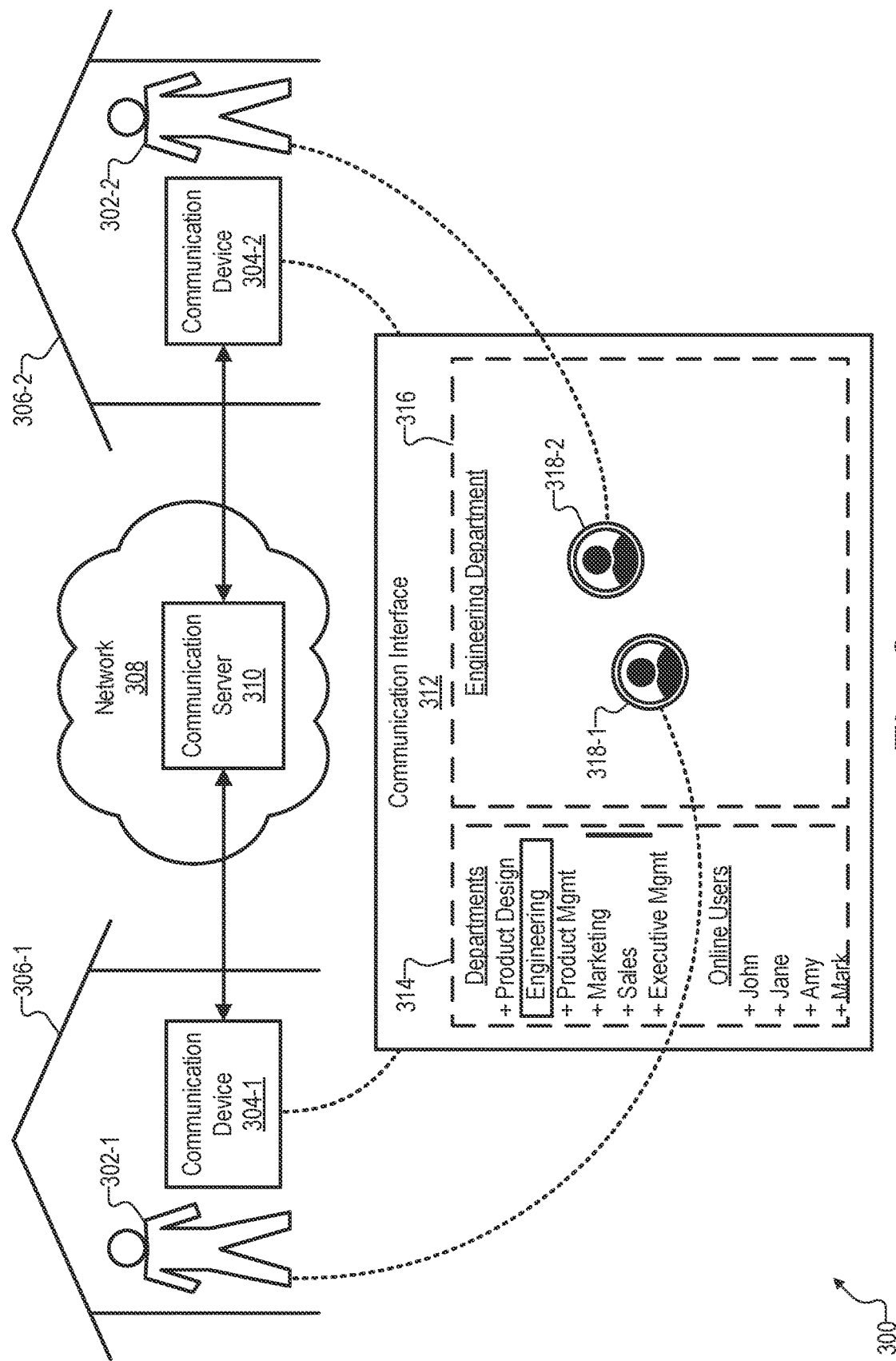
FIG. 3 shows an illustrative configuration in which the communication provider system of FIG. 1 may operate in accordance with principles described herein.

FIG. 3 shows an illustrative configuration 300 in which system 100 may operate in accordance with principles described herein. Specifically, as shown, configuration 300 shows first and second users 302 (i.e., users 302-1 and 302-2) that use respective communication devices 304 (i.e., communication devices 304-1 and 304-2) to communicate from different remote sites 306 (i.e., sites 306-1 and 306-2) over a network 308 that may employ a communication server 310 to facilitate or manage the communication. An implementation of system 100 may be implemented within either or both communication devices 304, within communication server 310 or components of network 308, or by computing resources spread across a combination of these and/or other suitable systems and devices. In certain examples, each communication device 304 may be associated with (e.g., may implement or be communicatively coupled with) a respective implementation of system 100 that may function in similar ways to provide communication capabilities for the respective users 302 using the communication devices 304.

Also shown in configuration 300 is a communication interface 312 (also referred to as a virtual communication portal) that may be generated or otherwise provided by system 100 to be presented to users 302 by way of communication devices 304. As shown, communication interface 312 may include a navigation panel 314 and a shared virtual space 316 that includes different avatars 318 (e.g., an avatar 318-1 associated with user 302-1 and an avatar 318-2 associated with user 302-2) depicted at different locations within shared virtual space 316.

Within a configuration such as configuration 300, system 100 may perform method 200 and/or any of the other operations described herein. Certain aspects of components depicted in configuration 300 will now be described in more detail.

Users 302 may represent persons who are using system 100 in any suitable way, such as to communicate with one another or with other users who are not explicitly shown in configuration 300. For example, users 302 may represent employees of an organization (e.g., a company) who are working from home and need to communicate with one another and/or with other employees (e.g., other employees working from home, employees working from the office, etc.) as part of their work assignments. To this end, users 302 may use their respective communication devices 304, which may be implemented by user equipment devices such as mobile devices (e.g., smartphones, tablet devices, etc.), personal computer devices (e.g., laptop or desktop computers, etc.), or other such devices that are used by users 302 to perform work-related tasks or otherwise to communicate as may be desirable for a particular communication application or use case. As will be described in more detail below, communication devices 304 may also, in certain examples, be implemented or communicatively coupled with head-mounted or other types of extended reality presentation devices that may be worn by users 302 to experience extended reality communication session described herein.

In the example of configuration 300, sites 306 may be understood to represent two unrelated sites that are remote from one another. For example, sites 306 may represent the respective homes of users 302, which may be at different addresses nearby one another (e.g., in the same city, etc.) or across the country or the world from one another. As another example, one or both of sites 306 may represent remote workspaces other than home in which users 302 are working at a given time. For instance, sites 306 may represent college campuses, coffee shops, temporary office spaces, or the like. In certain cases, sites 306 may represent different physical offices that are operated (e.g., owned or leased) by a particular organization, such as different offices of the organization located in different cities. Sites 306 may also represent different offices within the same building (e.g., an apartment building, a physical office building) if the sites are remote enough from one another that it is desirable for users 302 to communicate electronically using communication interface 312 rather than in person. Additional examples of sites from which users 302 may communicate using a communication interface will be described in more detail below.

Network 308 may be implemented by any suitable network or networks that include any elements or technologies as may serve a particular implementation. For instance, network 308 may include elements of a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). Additionally or alternatively, network 308 may include elements of various interconnected networks that are outside of any provider network and outside the control of any provider of such a provider network. Elements of the Internet, a wide area network, a content delivery network, and/or any other suitable network or networks are examples of other elements that may be included within network 308. Any of these provider or non-provider networks or network elements may provide data delivery between communication devices 304-1 and 304-2.

Communication server 310 may be communicatively coupled to either or both of communication devices 304 by way of network 308 and may facilitate communications between communication devices 304 in any manner as may serve a particular implementation. For instance, in certain implementations, communication server 310 may represent a MEC server device, cloud server device, or other distributed computing device that manages communication data between communication devices 304 in the ways described herein. As mentioned above, in certain examples, system 100 may be fully or partially implemented by communication server 310. In other examples, implementations of system 100 may exist on each of communication devices 304 and communication server 310 may be omitted or perform other operations to facilitate the communication provided by communication device 304. In some implementations, multiple communications servers 310 may be employed in a distributed fashion, such as for purposes of scalability, redundancy, and service quality (e.g., latency reduction), and system 100 may be deployed across such multiple communications servers 310.

Figure 4:
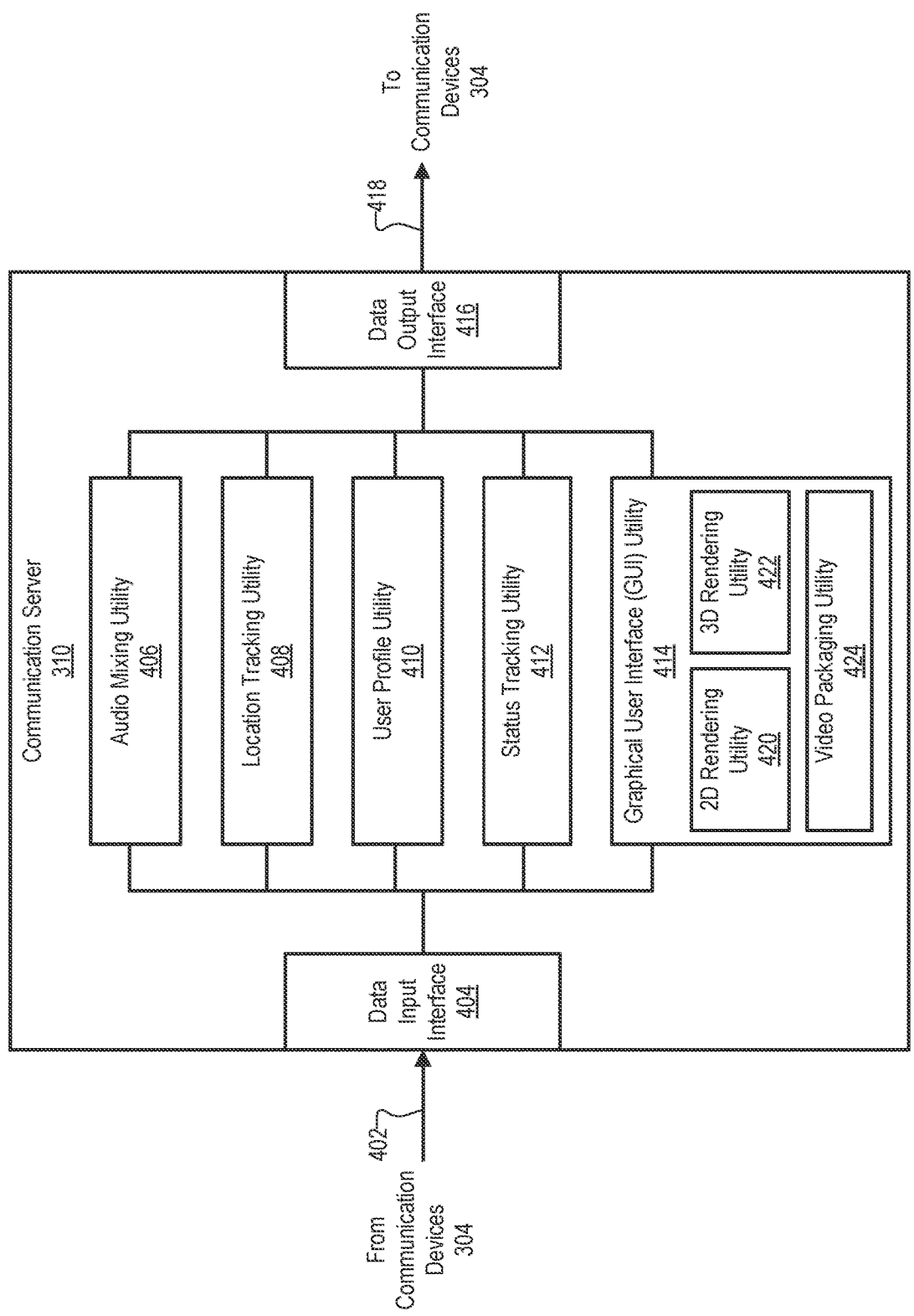
FIG. 4 shows an illustrative implementation of a communication server such as is included in the configuration of FIG. 3 in accordance with principles described herein.

To illustrate one particular way that communication server 310 may be implemented in certain embodiments, FIG. 4 shows an illustrative implementation of communication server 310 that includes various data inputs, data outputs, communication interfaces, and processing utilities to perform operations described herein. Specifically, as shown in FIG. 4, this implementation of communication server 310 receives input data 402 from one or more communication devices 304 using a data input interface 404, which provides relevant input data to an audio mixing utility 406, a location tracking utility 408, a user profile utility 410, a status tracking utility 412, and a graphical user interface ("GUI") utility 414. As shown, each of these and/or any other utilities not explicitly shown may communicate with one another by way of a service bus or another suitable architecture or form of communication. Audio mixing utility 406 may generate audio data, while GUI utility 414 may generate and/or update visual user interface data (e.g., 2D video data, 3D video data, etc.) for display in a graphical user interface such as communication interface 312. As shown, this audio data and user interface data may be provided to a data output interface 416 that provides this information to communication devices 304 as output data 418. Each of the components shown in FIG. 4 will now be described in more detail.

Input data 402 may include any suitable data received (e.g., transmitted in real time) from one or more communication devices such as communication devices 304-1 and 304-2 shown in configuration 300. Input data 402 may include audio data such as voice data representative of impromptu communication being spoken by one of users 302 or voice data that is part of a communication session such as a voice call or an extended reality communication session. Input data 402 may also include other types of user input data and/or metadata that may, for instance, indicate when a user 302 logs into the communication portal, where a user 302 desires to set and/or move the location of his or her avatar 318, whether a user 302 is available for various types of communication, a request to initiate a communication session (or an acceptance of such a request from another user), an indication of whether the user elects to operate the communication interface in the 2D mode or 3D mode, profile information associated with the user, and so forth.

Data input interface 404 may receive input data 402 by way of a network such as network 308. As such, data input interface 404 may be configured to communicate with communication device 304 by way of any technologies and/or protocols supported by the network as may serve a particular implementation. In some examples, data input interface 404 may preprocess, sort, and/or steer input data 402 to utilities 406-414 to ensure that each utility receives any input data that is relevant to the function of that utility.

Audio mixing utility 406 may receive and process audio input data (e.g., by way of data input interface 404) and output audio data (e.g., by way of data output interface 416) to be presented to different users 302 by their respective communication devices 304. As such, audio mixing utility 406 may receive data from location tracking utility 408 (e.g., to determine where a particular user's avatar is located in relation to other users' avatars to properly mix extended reality and/or impromptu communications), user profile utility 410 (e.g., to determine if a user is logged in, is engaging in a formal communication session, etc.), status tracking utility 412 (e.g., to determine whether a user is in the 2D or 3D mode, whether the particular user's avatar is available to receive certain types of communication such as impromptu communication, etc.), and/or other utilities (e.g., including utilities not explicitly shown in FIG. 4) as may serve a particular implementation.

As with each of the utilities shown in FIG. 4, it will be understood that audio mixing utility 406 may be implemented by dedicated or shared hardware and/or software of communication server 310 to implement functionality described herein. For instance, in certain examples, a single processor (or group of processors) associated with communication server 310 may execute software instructions to implement audio mixing utility 406 and one or more additional utilities shown in FIG. 4 (including all of the utilities in certain examples). In other examples, each utility may be implemented by a separate server or server component (e.g., each being associated with a dedicated processor or the like) as may serve a particular embodiment.

As certain implementations of audio mixing utility 406 combine different sounds together into a single mix to be presented to a particular user (e.g., a mix including different extended reality or impromptu communications from around the shared virtual space, etc.), audio mixing utility 406 may be configured to apply various filtering techniques, proximity effects, and so forth. For instance, in certain examples, a stereo mix may be provided to a particular communication device 304 and audio mixing utility 406 may configure the audio data to simulate directional audio that will seem to a user to originate from a particular direction within the shared virtual space. In this way, a user may sense which direction communication (e.g., extended reality communication, impromptu communication, etc.) comes from to help the user (along with visual cues provided by the user interface) to discern who is speaking. Additionally, audio mixing utility 406 may access data representative of various aspects affecting the acoustics of the shared virtual space (e.g., the location of virtual objects such as walls, cubicle partitions, etc., in the space; the virtual materials from which such virtual objects are constructed and their acoustic properties; etc.). By taking these types of data into account, audio mixing utility 406 may simulate the impact of virtual barriers on audio propagation, accurately simulate sound propagation within the virtual environment, and so forth.

Location tracking utility 408 may receive and process user input data and provide, in real time, information regarding the virtual locations of each avatar included within a shared virtual space. From the time that a user logs into the communication portal until he or she logs out, location tracking utility 408 may identify, update, and/or otherwise keep track of the virtual location of an avatar of that user. As location tracking utility 408 generates this location data, location tracking utility 408 may provide the location data to GUI utility 414 to indicate where avatars for each user are to be placed within the shared virtual space. Additionally, the location data may be provided to audio mixing utility 406 to facilitate in audio mixing operations. For example, certain types of location-based communication (e.g., extended reality communication, impromptu communication, etc.) may be mixed at a sound intensity level that may depend on a relative proximity of one avatar to another. Additionally, location data may inform the audio mix since, as mentioned above, directional audio may be generated based on a relative direction from which an audio is virtually originated.

Location tracking utility 408 may be provided with virtual space configuration information, and may use the virtual space configuration information to enforce rules on the locations of avatars within a shared virtual space. For example, location tracking utility 408 may access space layout information (e.g., space sizing, barrier locations and characteristics, special space characteristics for designated areas such as meeting rooms, break rooms, etc.) from a data store. Location tracking utility 408 may then enforce rules based on the space layout information. For example, location tracking utility 408 may enforce that avatars do not move outside the shared virtual space, that avatars do not move through barriers, that avatars do not occupy the same space at the same time, that only a certain number of avatars occupy a given space, and/or any other such rules as may serve a particular implementation.

User profile utility 410 may receive and process user input data so as to provide, in real time, information regarding various aspects of the each user's profile that are to be graphically reflected in the graphical user interface. For example, user profile utility 410 may maintain images representative of each different user (e.g., profile photos of the users, etc.) that may be provided for display as part of the avatars presented in the shared virtual space. As another example, user profile utility 410 may manage invitations and/or acceptances of communication sessions and perform various other functions described herein. Additionally, user profile utility 410 may manage various settings and/or preferences for each user (e.g., information that may be reflected in navigation panel 314 as will be described below, etc.). For instance, user profile utility 410 may track whether each user is currently online, maintain data indicating which departments each user is part of and/or where the user fits in a reporting structure of an organization, manage a setting indicating whether a particular user has stereo audio capabilities that would support directional audio capabilities such as described above, and so forth.

Status tracking utility 412 may receive and process additional user input data that may be sent deliberately by a user or provided automatically by a communication device to indicate various aspects of the user's current status. For example, status tracking utility 412 may track whether the user is currently in the 2D mode or 3D mode, whether the user has requested a change from one of the 2D or 3D modes to the other, whether current conditions (e.g., rules associated with a particular location of the avatar, etc.) call for an automatic change from one of the 2D or 3D modes to the other, whether the user is engaged in a communication session (and, if so, what type of communication session it is), and so forth. As another example, status tracking utility 412 may track the availability status of the user. Thus, if a user decides to lower his or her availability (e.g., to disable impromptu communications in order to focus on a particular task), status tracking utility 412 may receive data indicating this preference and adjust an availability status for the user. If a user initiates a communication session (e.g., an extended reality communication session), status tracking utility 412 may determine at the commencement of the communications session that the availability status for the user should be changed for the duration of the session and may update the availability status accordingly.

Status tracking utility 412 may provide any of this or other status data to any of the other utilities. For example, by providing the status data to audio mixing utility 406, audio mixing utility 406 may determine how to mix audio for each user (e.g., whether audio should be mixed to emulate a 3D environment based on whether the user is experiencing the 3D mode, whether impromptu communication should be included in the mix based on the user's availability status, etc.). Additionally, status tracking utility 412 may provide information to GUI utility 414 to allow proper status to be reflected in the user interface. For example, status data provided to GUI utility 414 may indicate whether GUI utility 414 is to render and provide a 2D view of the shared virtual space or a 3D view of the shared virtual space (each of which will be described and illustrated in more detail below). The status data may also indicate what type of visual data GUI utility 414 is to provide (e.g., 2D video for the 2D mode, 3D video for the 3D mode, wearable-formatted data for an extended reality experience in the 3D mode, etc.), how the data is to be packaged (e.g., as prerendered video data, as an atlas sheet configured for use by a client device to render, etc.), which device or devices associated with a particular user the data is to be provided to (e.g., the communication device 304, an extended reality presentation device associated with the communication device 304, or both of these devices, etc.), and so forth. Similar status data provided to audio mixing utility 406 may indicate whether the audio mix is to be configured for and/or sent to speakers of a communication device 304 such as a laptop computer, to earphones of an extended reality presentation device (e.g., in a binaural rendering that simulates extended reality effects of the virtual space, etc.), or the like. Additionally, the status data associated with the availability status of each user may be provided to GUI utility 414 for use in properly displaying each avatar with its respective user's current availability status, while other status data may be used in other similar ways as may serve a particular implementation.

GUI utility 414 may receive data from various sources as have been described and may process, package, and provide visual data (e.g., video data, extended reality data, data allowing for a GUI to be constructed and/or updated by communication devices 304, etc.) to each communication device 304 by way of data output interface 416 to facilitate each communication device 304 in presenting various graphical aspects of a communication interface such as communication interface 312. For example, based on all the input data received, GUI utility 414 may provide data sufficient to allow a communication device 304 to present navigation panel 314, shared virtual space 316 (e.g., in the 2D mode or the 3D mode), and/or any other panels as may be included in a particular implementation of communication interface 312. As will be described in more detail below, in some examples, GUI utility 414 may provide visual data not only for communication devices 304 (e.g., to be displayed on computer monitors, mobile device screens, etc.) but also for extended reality presentation devices associated with such communication devices 304 (e.g., to be displayed on stereoscopic screens of a head-mounted viewing device configured to provide an extended reality experience). Moreover, as avatars move and change status, as different views are selected, and as other changes occur, GUI utility 414 may continually provide information allowing each communication device to provide a coherent and relevant user interface to its respective user 302.

GUI utility 414 may include any suitable sub-utilities or other processing modules to facilitate data processing and packaging as may serve a particular implementation. For example, as shown in this example, GUI utility 414 may include a 2D rendering utility 420, a 3D rendering utility 422, and a video packaging utility 424, as well as any other sub-utilities and/or processing modules as may be used in a given architecture.

2D rendering utility 420 may generate visual data associated with 2D aspects of the communication interface. For example, based on information from location tracking utility 408 (e.g., respective position data for each avatar within the shared virtual space), user profile utility 410 (e.g., respective profile images for each avatar), status tracking utility 412 (e.g., whether the user is in the 2D mode or 3D mode, current availability status data for the user, etc.), and/or other suitable information, 2D rendering utility 420 may generate an overhead or isometric view of shared virtual space 316 when the user is in the 2D mode. Such 2D views of illustrative shared virtual spaces will be shown and described in more detail below. Additionally, along with providing the 2D view in 2D mode, 2D rendering utility may provide graphical data for navigation panel 314 and/or any other 2D panels or panes within communication interface 312 as may be present in a given implementation. In certain examples, such data may be fully rendered at 2D rendering utility 420 and streamed to communication devices 304 for display without further rendering work needing to be performed. In other examples, data describing various 2D elements to be displayed may be generated and provided by 2D rendering utility 420 such that the communication devices 304 may themselves perform the graphical rendering of the communication interface based on the data provided.

3D rendering utility 422 may generate visual data associated with 3D aspects (e.g., including extended reality aspects) of the communication interface. For example, based on information from location tracking utility 408 (e.g., respective position data for each avatar within the shared virtual space), user profile utility 410 (e.g., respective profile images for each avatar or live video of each user), status tracking utility 412 (e.g., whether the user is in the 2D mode or 3D mode, current availability status data for the user, etc.), and/or other suitable information, 3D rendering utility 420 may generate a 3D view of shared virtual space 316 when the user is in the 3D mode. In some examples, the 3D view may be configured for presentation on the screen of a communication device (e.g., a laptop monitor, a mobile device screen, etc.), similar to a 3D video game or the like. Additionally or alternatively, 3D rendering utility 420 may generate a more immersive 3D view of the shared virtual space for presentation by an extended reality presentation device, as will be described in more detail below. In such examples, 3D rendering utility 422 may receive real-time movement data (e.g., head turn data, etc.) representative of how the user is moving, which direction the user is looking, and so forth. Along with other data described above, this movement data may be accounted for in generating a 3D immersive view of the shared virtual space that is continuously updated to provide an immersive extended reality experience for the user. 3D views of illustrative shared virtual spaces will be shown and described in more detail below.

Because the processing needed to render a 3D view of a virtual world in real time may be significant, certain implementations of communication server 310 may perform all of the rendering work within 3D rendering utility 422 such that video data may be streamed to communication devices 304 (and to associated extended reality presentation devices in certain examples) for display without further rendering work needing to be performed by the devices. In these examples, the user movement data may be received and fully accounted for at the server by 3D rendering utility 422. In contrast, certain implementations may leave some of all of the rendering work to the communication devices 304 such that the motion data may not be needed or provided to 3D rendering utility 422 and the video data generated by 3D rendering utility 422 is not yet fully rendered. For instance, 3D rendering utility 422 may provide various 2D video patches from various virtual viewpoints around the shared virtual space (e.g., perspective viewpoints, orthographic viewpoints, etc.) such that a communication device or extended reality presentation device may render, based on the 2D video patches and based on movement data that is being detected in real time, the immersive 3D view of the virtual space. As another example, 3D rendering utility 422 may provide volumetric models of the shared virtual space and/or each of the various objects included therein (e.g., 3D avatars of the other users, desks, walls, doors, etc.) that the communication device and/or the extended reality presentation device may use to render the 3D view. In some examples, the rendering work may be dynamically bifurcated in different ways based on processing resources and communication resources (e.g., network performance, etc.) that are available.

Video packaging utility 424 may package and prepare the data that 2D rendering utility 420 and 3D rendering utility 422 generate in any suitable way. For example, video packaging utility 424 may include one or more encoders for encoding video data into a format that is suitable for transmission to communication devices 304. In some examples, the encoded data may also be compressed by video packaging utility 424 to decrease the amount of data that must be transmitted and/or stored. In certain examples, video packaging utility 424 may also perform a filtering function to ensure that a given communication device receives visual data that is useful without receiving redundant or unneeded data that would decrease the efficiency of the system. For instance, in implementations in which 2D video patches are provided for the communication device to render into the 3D view, video packaging utility 424 may determine that certain video patches of all the patches available for the virtual space are not currently needed for the 3D view that is to be rendered by a particular communication device. Similarly, video packaging utility 424 may determine that certain video patches represent parts of the virtual world that the user can see well (e.g., large objects, objects that are nearby the user's virtual location, etc.), such that these patches may be represented at a relatively high quality level (e.g., a high resolution). Other video patches may be similarly determined to represent parts of the virtual world that are not as visible to the user (e.g., small objects, objects that are further away from the user's virtual location, etc.) such that these patches may be represented at lower quality levels.

Video packaging utility 424 may package such 2D video patches in any suitable way, including by tiling the patches in atlas frames that each include a tiled conglomeration of frames of a plurality of 2D video patches to be provided to a particular communication device. In some examples, the atlas frame sequences provided to a given communication device may be customized to include 2D video patches selected specifically for that communication device (e.g., to include only the relevant patches, to include each patch at an appropriate level of detail, etc.).

Data output interface 416 may receive audio data, visual data, metadata, and/or any other suitable types of data from utilities 406-414, and may communicate this data as output data 418 to communication devices 304 by way of a network such as network 308. As such, like data input interface 404, data output interface 416 may be configured to communicate with communication devices 304 by way of any technologies and/or protocols supported by the network as may serve a particular implementation. In some examples, data output interface 416 may process, package, sort, address, and/or steer output data 418 to particular communication devices 304 to ensure that each communication device receives data relevant to the function of that communication device.

The components described above may be implemented in one or more communication servers 310, for example, in a distributed manner to facilitate scalability, redundancy, and service quality (e.g., latency reduction). As such, an individual communications server 310 may include one or more components described above, and may communicate amongst other communication servers 310 when necessary to access needed capabilities.

Returning to FIG. 3, communication interface 312 represents a virtual communication portal that is implemented by hardware and software of system 100 and may be presented to either or both of users 302 by way of their respective communication devices 304. For example, communication interface 312 may be presented when a user 302 logs in to his or her device or to communication server 310 at the beginning of a workday, when the user 302 authenticates himself or herself to join a convention or other event that makes use of communication interface 312, or when the user 302 otherwise comes online to begin communicating with other users by way of system 100.

Within communication interface 312, a navigation panel 314 is shown to include certain categories (e.g., "Departments," "Online Users," etc.) that may facilitate a user 302 in exploring and discovering communication possibilities, filtering potential people to communicate with in various ways, and so forth. For example, as shown in FIG. 3, a section of navigation panel 314 for departments may allow a user to select a shared virtual space associated with a particular department (e.g., "Product Design," "Engineering," "Product Management," "Marketing," "Sales," "Executive Management," etc.) within the organization to see only users who are logged in and work in that department. At the moment captured by FIG. 3, for example, the "Engineering" department is shown to be selected such that shared virtual space 316 is labeled "Engineering Department" and depicts avatars 318 that will be understood to represent employees who work for that department. In other modes of operation not shown in FIG. 3, shared virtual spaces associated with several or all of the departments could be shown within communication interface 312 at once so that all the users logged in from the entire organization could be seen at a glance.

Also shown in navigation panel 314 is an "Online Users" category that lists names of users who are online and may potentially be communicated with. Whether a particular user may be communicated with (and the manner in which communications may be provided) may be determined at least in part by an availability status of the user, which may be indicated by a color of each avatar or name in the list, a background of each avatar or name in the list, or in another suitable way. For online users who are available (e.g., "John," "Jane," "Amy," "Mark," etc.), navigation panel 314 may provide easy and convenient ways to initiate communications sessions such as voice or video calls between two users, virtual meetings with groups of users, and so forth. For example, by clicking on one of the online users in navigation panel 314, a user may be given a menu of options for initiating communication of various communication types with the selected user, as will be described in more detail below.

Shared virtual space 316 is shown in this example to represent a particular department (i.e., the engineering department, as mentioned above). As such, avatars 318 for each user associated with the engineering department may be represented on a map of a shared virtual space representative of the engineering department. Specifically, as mentioned above and as illustrated by dotted lines, avatar 318-1 may by associated with (i.e., may represent) user 302-1 and avatar 318-2 may be associated with user 302-2 within shared virtual space 316. In FIG. 3, a 2D representation of shared virtual space 316 is shown and each avatar 318 is depicted as a circular token or profile icon that may include a depiction (e.g., a photo, a drawing or symbol, etc.) representative of the respective user 302. As will be described in more detail below, in other examples (e.g., when a 3D representation of shared virtual space 316 is shown), avatars 318 may be illustrated by 2D or 3D representations of the users (e.g., avatars having a 3D human form, etc.) as may serve a particular implementation.

Any suitable information about a user 302 that a particular avatar 318 represents may be indicated by the visual information presented by the avatar 318 within shared virtual space 316. For example, one piece of information that is readily apparent by looking at avatars 318 is their respective locations within shared virtual space 316. Specifically, avatar 318-1 is located at a first location while avatar 318-2 is located at a second location that is different from but relatively proximate to the first location. Other information that may be visually indicated by avatars 318 is the availability status of their respective users, whether the users are actively speaking, and so forth. As will be described in more detail below, in some examples, communication sessions may be initiated by clicking directly on avatars 318 (e.g., by way of a pop-up menu, etc.) in addition or as an alternative to communication initiated by way of navigation panel 314 in the ways described above.

As has been mentioned, methods and systems described herein for providing a communication interface to operate in 2D and 3D modes may find application in various contexts and with various use cases. With that understood, various example implementations referred to throughout this description include implementations in which the shared virtual space is a virtual office space associated with an organization employing a workforce of employees and each employee in the workforce is associated with a different avatar represented in the shared virtual space when the employee is logged into a virtual communication portal.

Figure 5B:
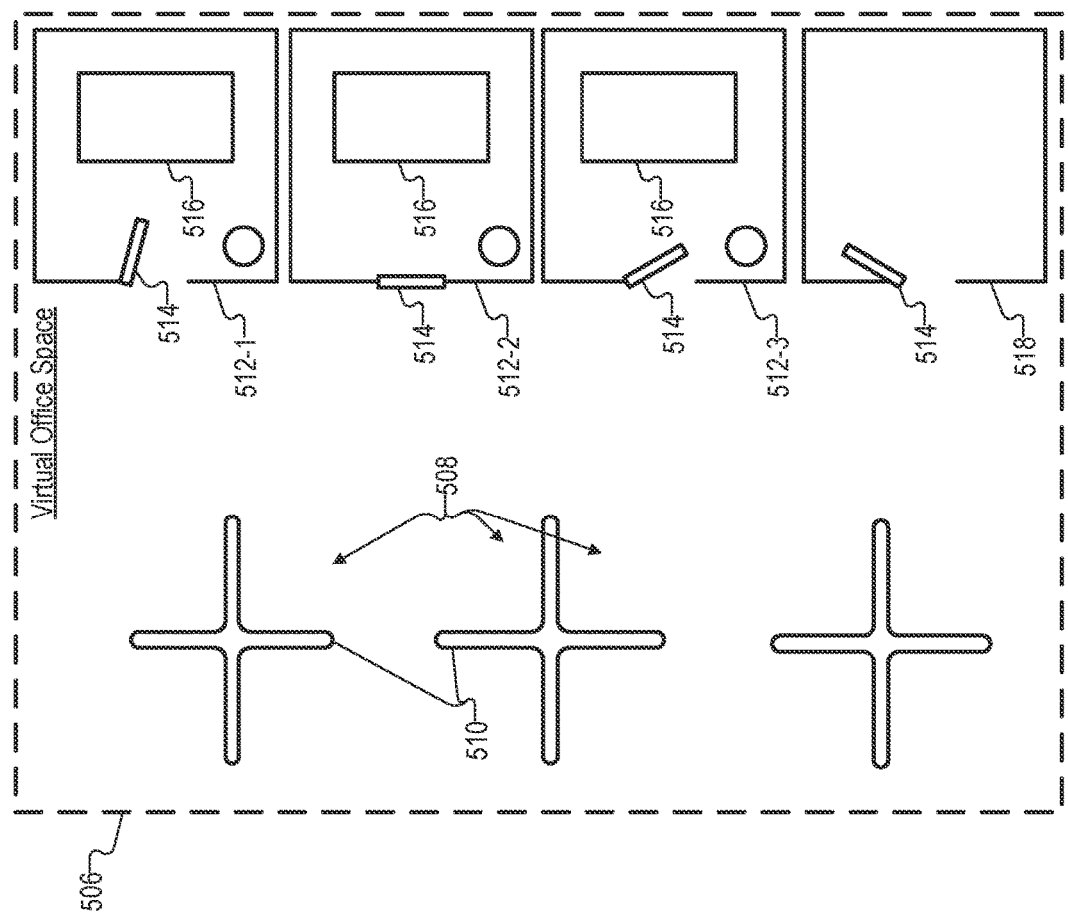
FIG. 5B shows an illustrative virtual office space in which avatars representing employees from the workforce of FIG. 5A may be virtually located in accordance with principles described herein.
Figure 5A:
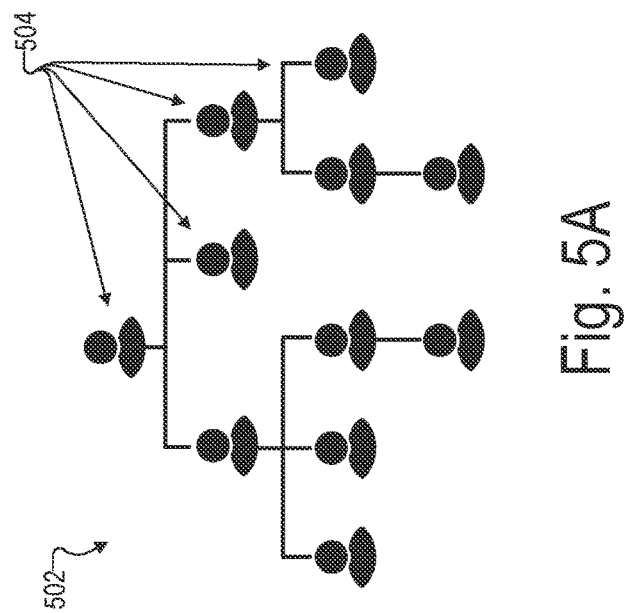
FIG. 5A shows an illustrative organization that employs a workforce of employees in accordance with principles described herein.

To illustrate, FIG. 5A shows an illustrative organization 502 that employs a workforce of employees 504 in accordance with principles described herein. Organization 502 may be any type of organization of people, created for any purpose and structured in any manner, as may serve a particular implementation. For example, organization 502 may be a commercial organization such as a company or corporation, a non-profit organization such as a charity or church, a governmental organization, a services organization such as a firm (e.g., a law firm, a consulting firm, etc.) or practice (e.g., a medical practice, etc.), or any other type of organization as may serve a particular implementation.

As shown, employees 504 within organization 502 may be organized according to a reporting structure, such that one or more employees of the organization are in top leadership roles (e.g., executive leaders, presidents, board members, etc.) while other employees are in lower leadership roles (e.g., middle management) and still other employees report to the leadership. As a result, the structure may include several levels that each have one or more employees working as peers, reporting to a particular manager, and so forth. It will be understood that employees 504 may be users of a virtual communication portal such as communication interface 312. For instance, one of employees 504 may act as user 302-1 and another employee 504 may act as user 302-2 in a communication scenario such as illustrated by configuration 300 of FIG. 3. While a relatively small number of employees is illustrated in FIG. 5A, it will be understood that organization 502 may, in certain examples, include hundreds or thousands of employees 504 structured in highly complex ways according to the needs of the organization.

FIG. 5B shows an illustrative virtual office space 506 within which avatars representing employees 504 from the workforce of FIG. 5A may be virtually located in accordance with principles described herein. While no avatars are explicitly shown in FIG. 5B (different illustrations of virtual office space 506 are illustrated below in which avatars are depicted in various locations throughout the virtual space), FIG. 5B shows various other aspects of virtual office space 506. Specifically, virtual office space 506 is shown to include individual workspaces 508 assigned to particular employees (e.g., analogous to desks, cubicles, offices, etc. in a physical office space). Virtual office space 506 also shows partitions 510 that define workspaces 508 so as to be arranged in groups (e.g., analogous to desk clumps in a physical office space) such that employees working on the same project or otherwise sharing common attributes may virtually work near one another for convenient access to one another (e.g., to build team camaraderie, to share ideas and/or ask questions of each other, etc.).

In the example of virtual office space 506, several different offices 512 (i.e. offices 512-1 through 512-3) are also shown as separate rooms off of the main area of the office space that includes workspaces 508 and partitions 510. As shown, each office 512 includes a door 514 that may be open or shut (e.g., to indicate a level of privacy desired by the office's occupant, etc.), a virtual desk 516, and/or any other suitable virtual objects (e.g., furnishings, plants, décor, bookshelves, etc.) as may serve a particular implementation. Another room 518 that includes a door 514 but does not include the same virtual objects as offices 512 is also shown in FIG. 5B. As will be described in more detail below, room 518 may be a virtual break room, a room dedicated to extended reality communication sessions (and which therefore may include a large amount of virtual whiteboard space, virtual objects for modeling, etc.), or any other type of virtual room as may serve a particular implementation.

While the number of objects shown in virtual office space 506 in FIG. 5B (e.g., partitions 510, doors 514, virtual desks 516, etc.) are relatively minimal for illustrative purposes, it will be understood that in certain implementations, a shared virtual space such as virtual office space 506 may be depicted in any suitable way and with any number or type of objects to decorate and outfit the space in any manner as may serve a particular implementation.

Figure 6:
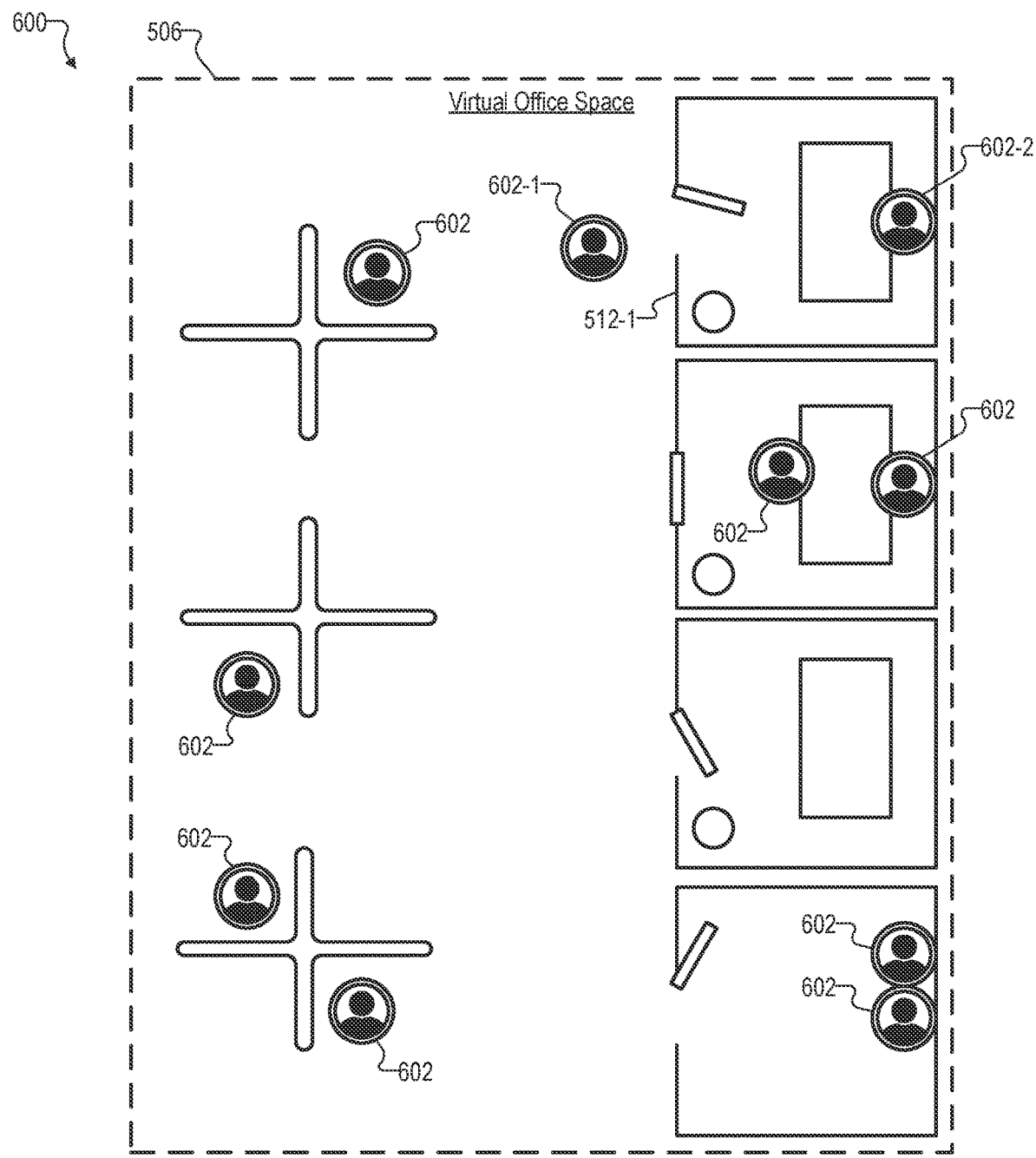
FIG. 6 shows an illustrative 2D representation of the virtual office space including various avatars in accordance with principles described herein.

FIG. 6 shows an illustrative 2D representation 600 of virtual office space 506 that includes various avatars 602. 2D representation 600 is similar to the view presented in FIG. 5B and will be understood to include the same objects described in connection with that figure, though each virtual object is not explicitly labeled in FIG. 6.

As shown, 2D representation 600 shows a top view of virtual office space 506 with relatively few details other than structural components such as office walls and partitions. In other implementations, however, it will be understood that a 2D representation such as 2D representation 600 may present virtual office space 506 in other ways as may serve a particular implementation. For example, rather than the top view of virtual office space 506 illustrated by 2D representation 600 of FIG. 6, certain implementations may employ a perspective or isometric view that provides a greater sense of depth and dimensionality for the virtual space. In some examples, different types of 2D representations (e.g., the top view, the isometric view, etc.) may be selected and switched between according to user preference. Additionally, different style treatments may be applied to certain implementations, including user-selectable style treatments (e.g., "skins") in some embodiments. For instance, one style treatment may be a minimalistic style that emphasizes the relative locations of avatars 602 and shows little other detail (as shown in FIG. 6), while other style treatments may include more immersive levels of detail (e.g., color and/or texture options for flooring, walls, desks, etc.), additional decorations (e.g., plants, desk chairs and other furnishings, water coolers, objects placed on desks, etc.), and so forth. The characteristics of the entities described above in the shared virtual space (e.g., location, styling, identifiers, etc.) may be stored, for example, in a data store accessible to location tracking utility 408 and/or GUI utility 414 such that the rendering of the visual representations of these entities may be correctly placed in the shared virtual space and the appearance may be presented in accordance with the appropriate style treatments.

Within virtual office space 506, users may move their respective avatars 602 freely to work, take breaks, approach others for impromptu conversations, and so forth. For example, in a similar way as an employee may walk over to a different area (e.g., a particular desk clump) of a physical office space to converse with one or more other employees there, a user may control his or her avatar 602 within virtual office space 506 to work in his or her assigned workspace, to go into an office of another user to have a private conversation there, and so forth. If a user is not available for communication (e.g., because he or she has not logged in to the communication interface or is in a meeting, etc.), the user's avatar 602 may not be shown to be located within virtual office space 506 at all in some examples. For instance, the avatar may not spawn into existence in the shared virtual space until the user is signed into the communication interface and the avatar may be relocated to a virtual conference room with other avatars when the user is engaged in a meeting with the users represented by those avatars.

Each avatar 602 presented in a 2D representation such as 2D representation 600 may simultaneously indicate various pieces of information. For example, as shown, each avatar 602 may indicate the identity of the user (e.g., by presenting a photo, likeness, or other representation of the user), the availability status of the user (e.g., by way of color, size, pattern, etc.), and the virtual location with which the user is associated within virtual office space 506. In some examples, the identity of the user may be depicted using a static image while, in other examples, the avatar 602 may include a video image of the user that is being captured live and in real time (e.g., by a webcam, etc.). In examples featuring such real-time video capture, the live video may be presented continuously or only at certain times such as when the user is detected to be speaking, when another user hovers a mouse cursor over the avatar of the user, or the like.

Additionally, in certain implementations, avatars 602 may further indicate other pieces of information as may serve a particular implementation. For instance, if a user is actively speaking, the avatar 602 of the user may indicate this graphically by pulsing, changing color, emitting a graphical representation of sound waves, or the like. This type of feature could provide social cues to facilitate users in deciding when to speak with one another (e.g., seeing that another user is speaking, a user may decide to virtually walk over and see what the other user is talking about or may decide to wait until the current conversation is over before attempting communication, etc.). As another example, if a user has not explicitly changed his or her availability status but is detected to be inactive (e.g., detected to no longer be sitting at his or her desk, detected to have not pressed a key in a certain amount of time, etc.) the user's avatar may reflect that in the availability status.

As has been described, for certain situations and/or certain communication sessions, significant limitations may arise with conventional remote communication modes such as textual messaging, voice calls, and even video calls or video conferencing. For example, as described above, certain non-verbal communication may be difficult to express with such communication modes and shared physical tools for communication (e.g., modeling objects, shared drawing surfaces, etc.) may not be supported in natural ways that suitably replicate in-person communication. As such, a user encountering this type of communication scenario may desire to engage in a more immersive mode of communication than is provided by conventional communication interfaces. For example, an extended reality communication session may be useful to allow users to fully take advantage of various non-verbal and object-based aspects of communication together with verbal aspects of communication.

To illustrate an example, a scenario will be considered in which a first user engages in an extended reality communication session with a second user. Referring to FIG. 6, the first user will be understood to be associated with the avatar 602 labeled as avatar 602-1, while the second user will be understood to be associated with the avatar 602 labeled avatar 602-2. As shown, avatar 602-1 is located just outside the door of office 512-1, while avatar 602-2 is seated at the desk within office 512-1 as avatar 602-1 approaches and requests to initiate the extended reality communication session.

The first user may make, and system 100 may receive, a request to initiate a particular type of communication session (e.g., an extended reality communication session in this example) in any manner as may serve a particular implementation. For example, the receiving of the request by system 100 may involve providing, to the first user, a menu of options corresponding to different communication types and detecting that the first user selects a particular one of the options (e.g., the extended reality option in this example) to request to initiate the communication session as a communication session of a particular communication type (e.g., an extended reality communication session in this example). The menu of options provided by system 100 may include options various types of communication. For instance, in one implementation, the menu may include a textual messaging option corresponding to a textual messaging communication type, a voice call option corresponding to a voice call communication type, a video call option corresponding to a video call communication type, an extended reality option corresponding to an extended reality communication type, and/or any other options corresponding to other communication types as may serve a particular implementation.

Figure 7:
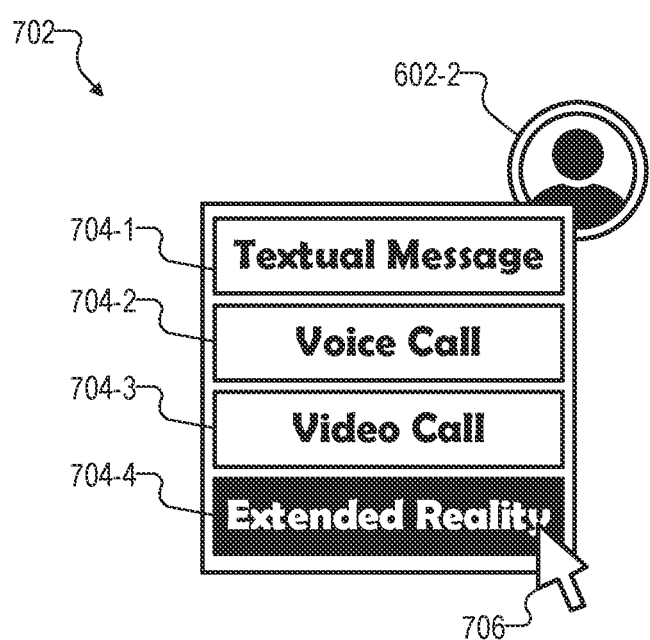
FIG. 7 shows an illustrative menu of options corresponding to different communication types in accordance with principles described herein.

To illustrate, FIG. 7 shows an illustrative menu 702 of options 704 (e.g., options 704-1 through 704-4) that correspond to different communication types. For example, as shown, menu 702 may be presented to the first user when the first user selects (e.g., clicks on) avatar 602-2 within 2D representation 600 of virtual office space 506 in order to initiate a communication session with the second user. As shown, option 704-1 is a textual messaging option configured to initiate a communication session of a textual messaging communication type with the second user, option 704-2 is a voice call option configured to initiate a communication session of a voice call communication type with the second user, option 704-3 is a video call option configured to initiate a communication session of a video call communication type with the second user, and option 704-4 is an extended reality option configured to initiate a communication session of an extended reality communication type with the second user. In certain examples, various other types of communication sessions (or subtypes of the illustrated communication types) may also be included on a menu such as menu 702. For instance, screen sharing or other visual options may be included in connection with textual message option 704-1, voice or video conferencing options for more than two people may be included in connection with the voice and video call options, whiteboarding or modeling sessions may be included in connection with the extended reality option, and so forth. As indicated by a selection cursor 706 controlled by the first user, the first user in this example may select extended reality option 704-4 to thereby initiate an extended reality communication session with the second user.

Upon receiving a communication initiation request (e.g., by way of a selection from menu 702), system 100 may initiate the communication session of the selected type between the first and second users. For instance, in this example, the initiated communication session is an extended reality communication session. As the extended reality session is initiated, system 100 (e.g., the instance of system 100 associated with the first user) may replace 2D representation 600 of virtual office space 506 with a 3D representation of virtual office space 506 that includes a 3D representation of avatar 602-2 of the second user. Additionally, to enhance the immersiveness further, system 100 may, in certain implementations, present the extended reality communication session by way of a head-mounted extended reality presentation device configured to be worn by the first user.

Figure 8:
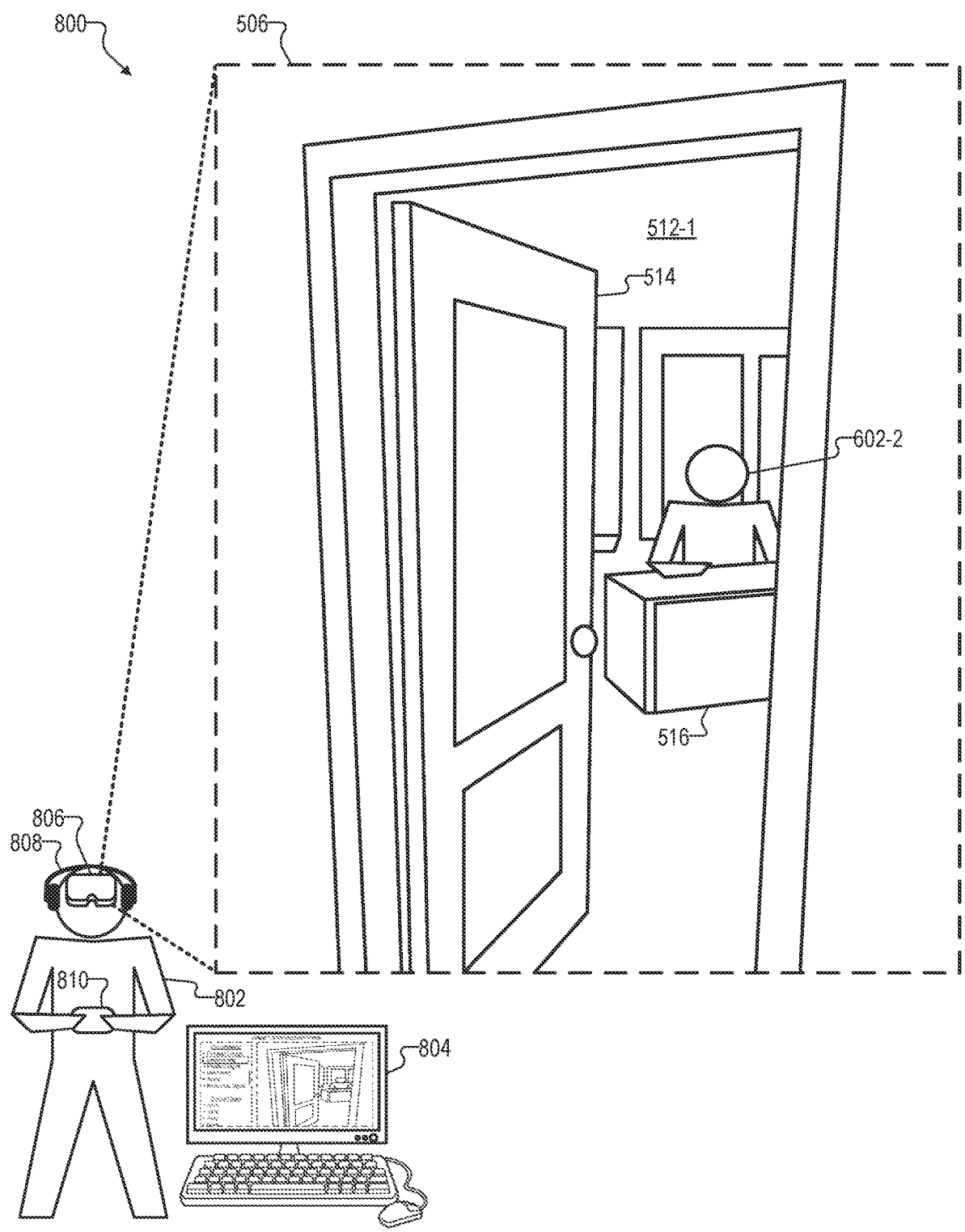
FIG. 8 shows an illustrative 3D representation of the virtual office space from a perspective of a particular avatar in accordance with principles described herein.

To illustrate, FIG. 8 shows an example 3D representation 800 of virtual office space 506 from a perspective of avatar 602-1. As shown in FIG. 8, a user 802 (i.e., the first user of this example who is initiating the extended reality communication session) is using a communication device 804 that is implemented as a personal computer and operates as described above in relation to communication devices 304. A communication interface implementing communication interface 312 is shown to be presented on the screen of communication device 804, but, rather than a 2D representation of the shared virtual space shown in FIG. 3, FIG. 8 shows 3D representation 800 within the communication interface alongside a navigation panel similar to navigation panel 314 (e.g., in the pane of the communication interface for the shared virtual space).

In some examples, user 802 may view 3D representation 800 within the communication interface on the computer monitor. However, as illustrated, user 802 may also have an option of temporarily using an extended reality presentation device that may include components such as a head-mounted display 806, a personal sound system 808 (e.g., headphones), a portable controller 810, and/or any other components as may serve a particular implementation. The extended reality presentation device comprising head-mounted display 806, personal sound system 808, and portable controller 810 may be worn by user 802 (as shown) and may be associated with communication device 804 in any suitable manner. For example, the extended reality presentation device may implement communication device 804 (in which case the personal computer may not be used), may be included as part of communication device 804, may be a separate system communicatively coupled with communication device 804, or may be associated with communication device 804 in another suitable way.

Head-mounted display 806 may present stereoscopic images to each eye of user 802 to provide a sense depth for 3D representation 800 and may be configured to detect head movements of user 802 so as to update a field of view of 3D representation 800 accordingly. In this way, user 802 may look in any direction around virtual office space 506 in a natural and immersive manner so as to see 3D representations of virtual office space 506 and the objects included therein (e.g., walls, floor, desks, etc.), as well as to see and interact with respective 3D representations of avatars 602.

Personal sound system 808 may immersively present sound virtually propagating through virtual office space 506 to avatar 602-1 of user 802. For example, if the second user associated with avatar 602-2 speaks as part of the extended reality communication session, user 802 may hear audio representative of the speech by way of personal sound system 808. In some examples, various propagation effects may be applied to a binaural sound signal being presented to user 802 such that sounds will appear to user 802 to originate from their correct virtual sources, reflections and reverberation of virtual office space 506 will be simulated, and so forth.

In implementations involving a portable controller 810 (e.g., instead of or in addition to input provided by way of keyboard and/or mouse commands via communication device 804), a portable controller such as a gaming controller or the like may allow user 802 to control certain aspects of the extended reality experience (e.g., aspects that are not controlled by head turns, etc.). For example, user 802 may use portable controller 810 to continue moving his or her avatar around within virtual office space 506 (e.g., to walk into office 512-1 to talk to the second user via avatar 602-2, to shut door 514 of office 512-1, etc.). In certain examples, individual controllers (e.g., wands, gloves, etc.) for each hand of user 802, cameras and/or other vision detection devices positioned in the room, and/or other suitable sensors may be used to facilitate the extended reality presentation device in accurately detecting gestures and body movements (e.g., non-verbal communication) of user 802 such that these movements may be applied to avatar 602-1 in the virtual 3D world of virtual office space 506.

As shown in 3D representation 800 at the moment captured in FIG. 8, user 802 may be presented with a view looking into office 512-1 and, within the view, may see 3D representations of door 514, office 512-1, desk 516, other objects (e.g., the floor, the doorframe, walls, windows, etc.), and a 3D representation of avatar 602-2 sitting behind desk 516. As shown, the 3D representation of avatar 602-2 associated with the second user is a representation of a 3D human form depicted within 3D representation 800 of virtual office space 506. For example, the 3D human form may be based on a model previously created by the second user (e.g., by selecting various features for the model such as a head shape, a hairstyle, a skin tone, a particular set of eyes, a nose, a mouth, etc.) in any suitable manner. In certain implementations, the representation of the 3D human form may be customized to the second user. For instance, the customization may include overlaying, onto a face of the 3D human form, a likeness of the second user. As one example, a face of the 3D human form of avatar 602-2 may be automatically generated based on a photograph of the second user. As another example, a real-time image (e.g., based on live video from a webcam or the like) may be integrated with avatar 602-2 to make avatar 602-2 look more lifelike and more closely resemble the second user as the first user communicates with him or her.

After the extended reality communication session is finished (e.g., when the conversation is over and the first user (user 802) or the second user requests to terminate the session), system 100 may replace 3D representation 800 of virtual office space 506 with 2D representation 600 of virtual office space 506 (i.e., may switch the communication interface from the 3D mode back to the 2D mode). Just as the 2D-to-3D mode switching may be performed automatically based on the request of a particular communication type (e.g., the extended reality communication type or another suitable type), the 3D-to-2D switch back may similarly be performed automatically when the communication session of the particular communication type terminates. For example, during an initiated communication session (e.g., an extended reality communication session in this example) as 3D representation 800 is presented to user 802, system 100 may receive a request (e.g., by user 802 or by the second user by way of the communication interface) to terminate the initiated communication session. Then, in response to the request, system 100 may terminate the initiated communication session of the particular communication type. System 100 may automatically replace 3D representation 800 with 2D representation 600 on the screen of communication device 804 and/or the extended reality presentation device based on the terminating of the initiated communication session. In other examples, this switch may be triggered manually by one of the users, rather than automatically based on the communication type.

Figure 9:
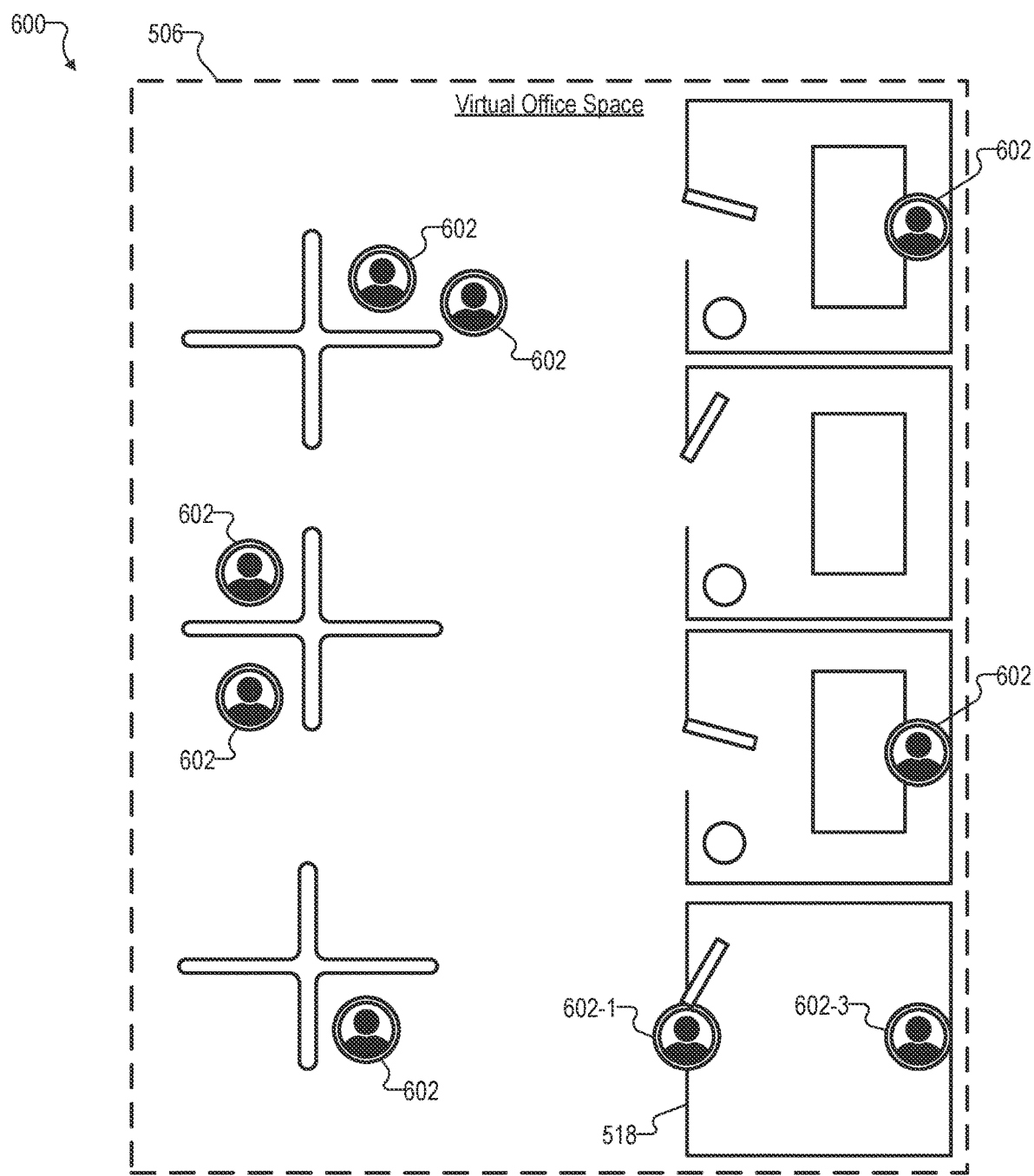
FIG. 9 shows the 2D representation of FIG. 6 as updated at a subsequent time in accordance with principles described herein.

FIG. 9 shows 2D representation 600 as updated at a subsequent time such as later in the day after the first and second users have finished the extended reality communication session described and illustrated above in FIG. 8. In FIG. 9, 2D representation 600 shows that various avatars 602 have moved around or have come and gone (e.g., shown by different avatars working in different workspaces, doors previously shut now being open, offices previously empty now being occupied or offices previously occupied now being empty, etc.). As shown, the first user associated with avatar 602-1 is now entering room 518, which is already occupied by an avatar 602-3 who will be understood to be associated with a third user.

In certain examples, system 100 may determine that a user moves his or her avatar into a predefined area within a shared virtual space (e.g., a particular room or other designated portion of the shared virtual space). Then, based on this determination that the user moves the avatar into the predefined area, system 100 may replace a 2D representation of the shared virtual space with a 3D representation of the shared virtual space. To illustrate with a specific example, it may be assumed that room 518 is designated as a predefined area in which a 3D representation of virtual office space 506 is desirable. For instance, room 518 may represent a break room in which employees may gather and socialize using extended reality to enjoy communication that most closely replicates in-person communication. In certain implementations, for instance, room 518 may include virtual reality games or other activities that user may engage in together to help build rapport and develop camaraderie.

As another example, room 518 may be a room that is dedicated to a particular communication type, such as an extended reality communication type. For instance, the walls of room 518 may include virtual drawing surfaces that users may use for virtual whiteboarding sessions, for pinning notices or important information, or the like. In certain implementations, room 518 may serve as a "war room" associated with a particular project that multiple employees are involved with (e.g., a large software product for a software development organization, a complex case for a law firm organization, etc.). As such, room 518 may be a convenient virtual location for users to engage in various types of extended reality whiteboarding, brainstorming, modeling, and other such communication sessions as such communication relates to the project. In these types of examples, system 100 may be configured to automatically switch to the 3D mode whenever a user moves his or her avatar into the predefined space (e.g., into room 518 in this example).

Figure 10:
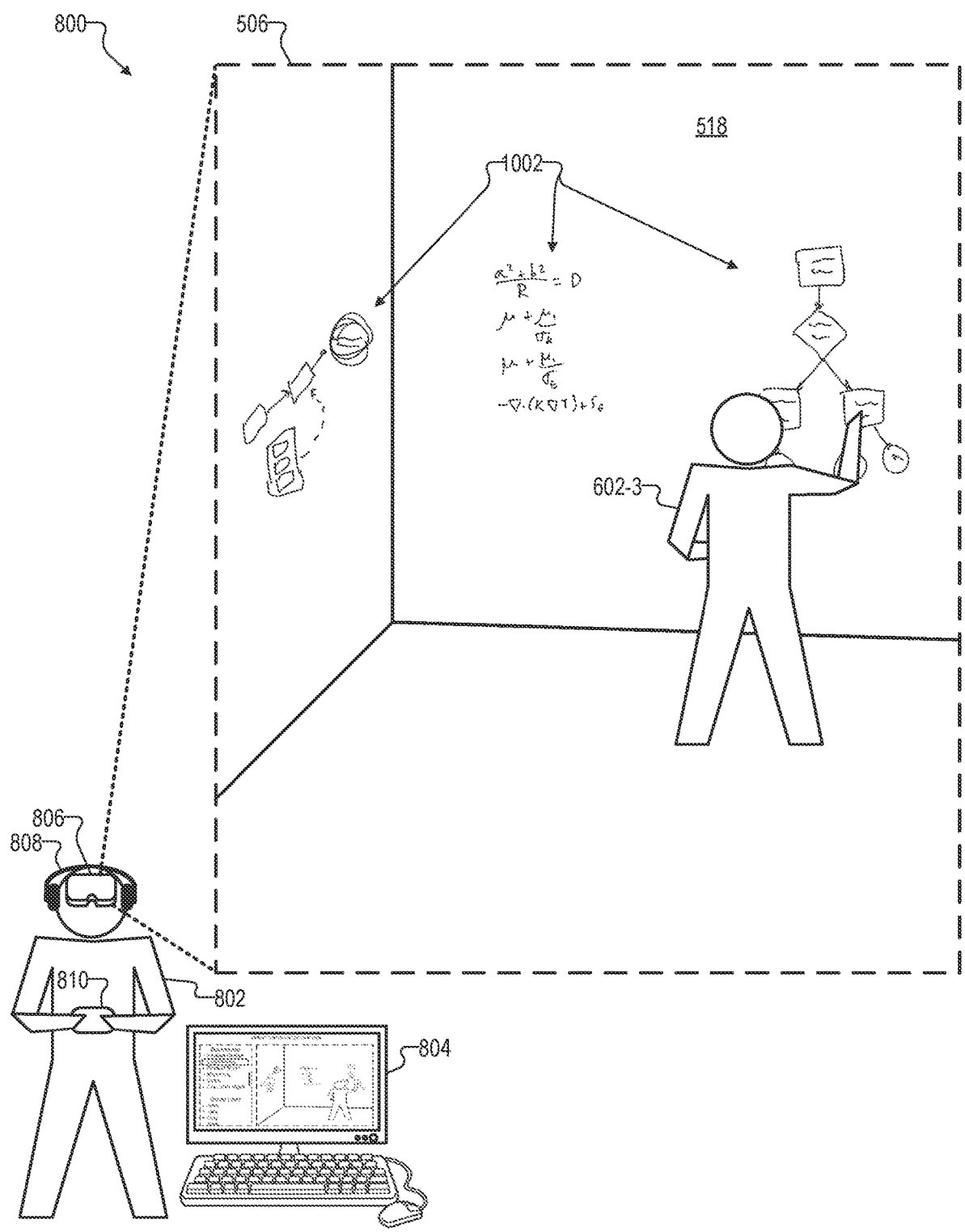
FIG. 10 shows the 3D representation of FIG. 8 as updated at the subsequent time in accordance with principles described herein.

To illustrate, FIG. 10 shows 3D representation 800 as updated at the subsequent time illustrated by 2D representation 600 in FIG. 9 as the first user (i.e., user 802) moves avatar 602-1 into the predefined area of room 518. As shown in FIG. 10, user 802 may experience room 518 using an extended reality presentation device such as the device described above in relation to FIG. 8 (i.e., the device including head-mounted display 806, personal sound system 808, and portable controller 810). Additionally, as further described above, communication device 804 may also (or alternatively) present 3D representation 800 as the user enters room 518 or at any other time that user 802 elects to experience virtual office space 506 in the 3D mode (e.g., using extended reality technology).

As user 802 moves avatar 602-1 into the room and begins his or her extended reality experience, FIG. 10 shows that avatar 602-3 is already in room 518 performing a whiteboarding activity. For example, the third user associated with avatar 602-3 may have invited user 802 to collaborate in a whiteboarding session and may be waiting for user 802 to arrive. Various drawings 1002 (e.g., block diagrams, equations, flowcharts, etc.) that avatar 602-3 has created or that have previously been created by other users within room 518 are shown on the walls of room 518, which will be understood to serve as virtual drawing surfaces (e.g., whiteboards) for the users.

Accordingly, in this example, an extended reality communication session between first user 802 and the third user may include (e.g., be implemented by) a whiteboarding session in which first user 802 interacts with the 3D representation of avatar 602-3 (associated with the third user) to jointly manipulate a 3D representation of virtual drawing surfaces (e.g., whiteboards covering the walls of room 518 in this example) that are included within 3D representation 800 of virtual office space 506. While not explicitly shown in FIG. 10, it will be understood that other objects that may similarly facilitate effective extended reality communication sessions may also be included in virtual office space (e.g., within room 518). For example, manipulable objects (e.g., blocks, building tools, etc.) may be present for the users to build models, simulate scenarios, and/or for any other suitable purpose.

As described above, one way that the 3D mode with which 3D representation 800 corresponds may switch back to the 2D mode is when a user elects to terminate a particular communication session (e.g., an extended reality communication session). In other examples, the 3D mode may switch back to the 2D mode when a user manually indicates a request to switch back. In still other examples (e.g., examples in which a predefined area such as room 518 is explicitly associated with the particular communication type such as the extended reality communication type), the 3D mode may automatically switch back to the 2D mode when the user leaves the predefined area (e.g., leaves room 518 in this example). More particularly, system 100 may determine that first user 802 moves avatar 602-1 out of the predefined area of room 518 and, based on this determination, system 100 may again replace 3D representation 800 of virtual office space 506 with 2D representation 600 of virtual office space 506.

In various implementations, shared virtual spaces may be entirely virtual or may correspond to real-world, physical virtual spaces in any manner as may serve a particular implementation.

As one example, FIGS. 3 and 5A-5B were described above to illustrate an example of a shared virtual space implemented as a virtual office space associated with an organization employing a workforce of employees that includes a plurality of users. This shared virtual space (e.g., shared virtual space 316 or virtual office space 506) may be understood to not be based on any physical office space used by the organization, but, rather, to be entirely virtual (e.g., existing only in a virtual universe and not the physical world). In such an implementation, each of the users associated with avatars 318 or 602 may be located at different locations remote from any physical office space used by the organization (e.g., if indeed the organization maintains physical office space and is not a virtual organization with no physical office space). For example, each user may be working from home or another suitable location as described above.

Figure 11:
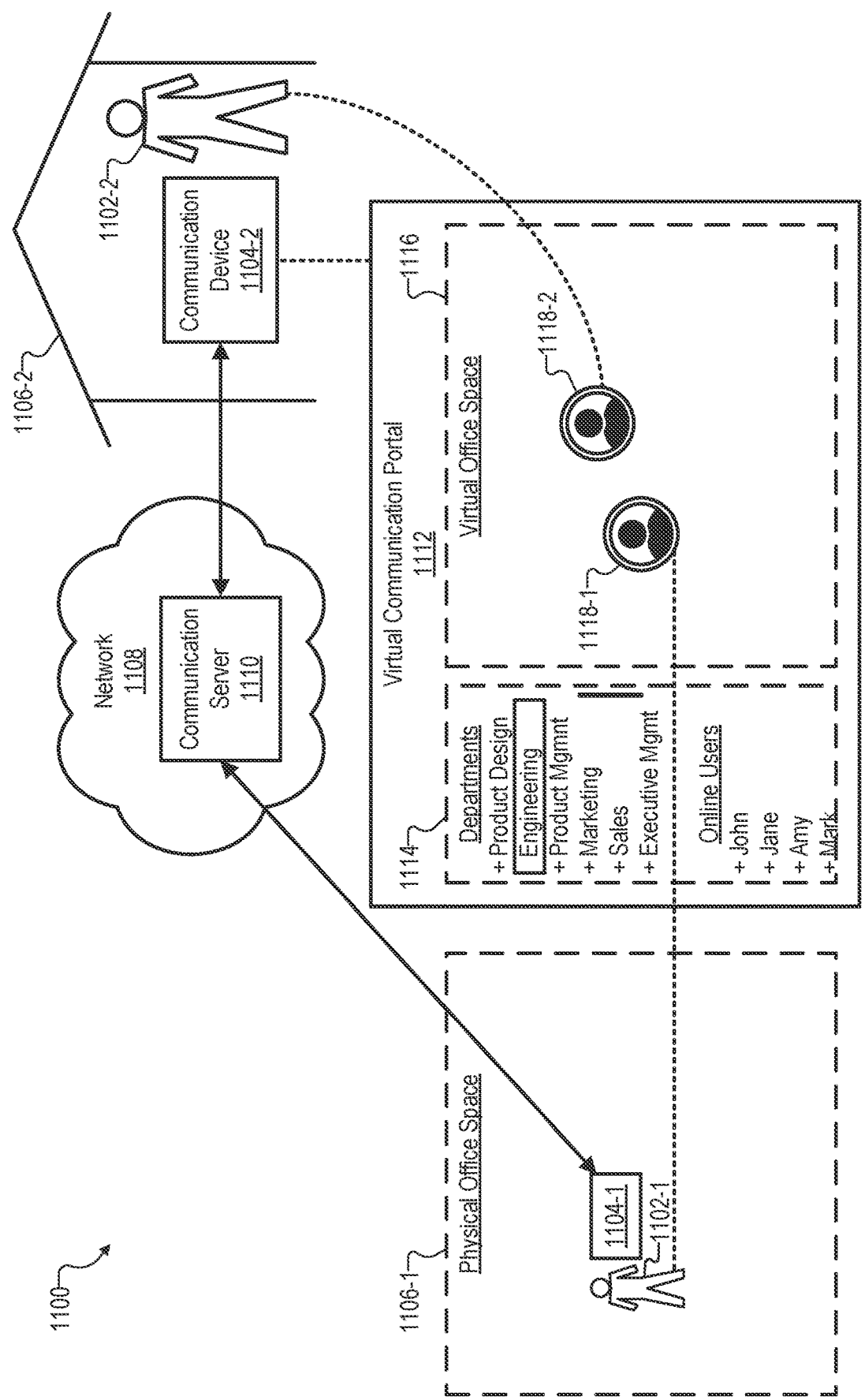
FIG. 11 shows another illustrative configuration in which the communication provider system of FIG. 1 may operate in accordance with principles described herein.

In contrast, as another example, FIG. 11 shows an illustrative configuration 1100 in which system 100 may operate and that illustrates an example of a different type of shared virtual space. Specifically, similar to configuration 300 of FIG. 3, configuration 1100 shows first and second users 1102 (i.e., first user 1102-1 and second user 1102-2) that use first and second communication devices 1104 (i.e., first communication device 1104-1 and second communication device 1104-2) from first and second sites 1106 (i.e., sites 1106-1 and 1106-2) to communicate by way of a network 1108 and, potentially, a communication server 1110. In this way, the users may login to use a virtual communication portal 1112 having a navigation panel 1114 and a virtual office space 1116 that includes avatars 1118 for the users (i.e., avatar 1118-1 representing user 1102-1 and avatar 1118-2 representing user 1102-2).

All of these components may be understood to operate similarly to analogous components described above in relation to configuration 300. However, as shown, rather than site 1106-1 being a home of user 1102-1 (or other remote site from which user 1102-1 chooses to work), in configuration 1100, site 1106-1 where user 1102-1 is located is shown to be a physical office space. As such, the shared virtual space presented within virtual communication portal 1112 may be a virtual office space 1116 that is associated with an organization employing a workforce of employees that includes users 1102-1 and 1102-2, and virtual office space 1116 may be based on the physical office space used by the organization. As shown, user 1102-1 may be located at this physical office space used by the organization (i.e., site 1106-1) while user 1102-2 may be located at a physical location remote from the physical office space used by the organization.

By modeling virtual office space 1116 after the physical office space of site 1106-1, system 100 may present a hybrid of a real and a virtual office space to the employees of the organization. For example, user 1102-1 may physically be located in his or her workspace in the physical office and this may be reflected by the virtual location of avatar 1118-1 within virtual office space 1116. Though user 1102-2 may not be physically located in his or her workspace proximate to that of user 1102-1 within the physical office space (e.g., because user 1102-2 is working remotely from site 1106-2), users 1102-1 and 1102-2 may communicate in similar ways as if they were both located in their respective workplaces within the physical office space.

A 2D or 3D model of the physical office space may be generated based on any blueprints, floor plans, 3D scans, or other information or technology as may serve a particular implementation. Based on such a model, system 100 may generate and present virtual office space 1116 to virtually replicate and/or have any suitable similarities (e.g., geometric, layout, décor, etc.) with physical office space 1106-1 as may serve a particular implementation. In certain examples, certain characteristics of virtual office space 1116 may replicate or be based on the physical office space of site 1106-1, while other characteristics may be customized and/or created to be only virtual with no real-world analog.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 12:
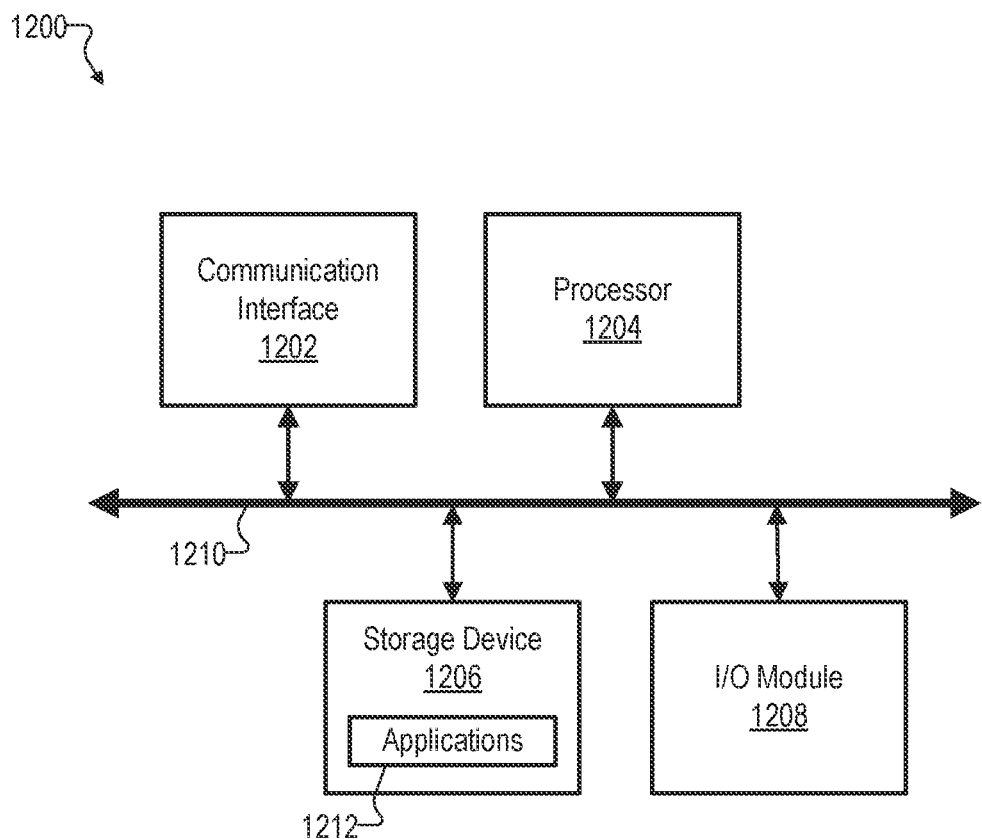
FIG. 12 shows an illustrative computing device that may implement communication provider systems and/or other systems and devices described herein in accordance with principles described herein.

FIG. 12 shows an illustrative computing device 1200 that may implement communication provider systems and/or other systems and devices described herein in accordance with principles described herein. For example, computing device 1200 may include or implement (or partially implement) a communication provider system such as system 100 or any component included therein or any system associated therewith (e.g., communication devices 304 or 1104, elements of networks 308 or 1108, communication servers 310 or 1110, etc.).

As shown in FIG. 12, computing device 1200 may include a communication interface 1202, a processor 1204, a storage device 1206, and an input/output (I/O) module 1208 communicatively connected via a communication infrastructure 1210. While an illustrative computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a single virtual experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with processor 104 of system 100. Likewise, memory 102 of system 100 may be implemented by or within storage device 1206.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
    presenting, by a communication provider system to a first user, a communication interface that displays a two-dimensional ("2D") representation of a shared virtual space from a top view so that both a 2D representation of a first avatar associated with the first user and a 2D representation of a second avatar associated with a second user are visible in the 2D representation of the shared virtual space;
    receiving, by the communication provider system by way of the communication interface, a request by the first user to initiate a communication session of an extended reality communication type with the second user;
    initiating, by the communication provider system based on the request, the communication session of the extended reality communication type with the second user;
    in response to the initiated communication session being of the extended reality communication type, modifying the presenting of the communication interface so as to cease displaying the 2D representation of the shared virtual space within the communication interface and to instead display a three-dimensional ("3D") representation of the shared virtual space within the communication interface, the 3D representation of the shared virtual space displaying an immersive view of a portion of the shared virtual space from a perspective of the first avatar so that a 3D representation of the second avatar is visible; and
    presenting, by the communication provider system, the communication session of the extended reality communication type by way of a head-mounted extended reality presentation device configured to be worn by the first user.

2. The method of claim 1, wherein the receiving of the request to initiate the communication session includes:
    providing, to the first user, a menu of options corresponding to different communication types, the menu of options including:
        a textual messaging option corresponding to a textual messaging communication type,
        a voice call option corresponding to a voice call communication type,
        a video call option corresponding to a video call communication type, and
        an extended reality option corresponding to the extended reality communication type; and
    detecting that the first user selects the extended reality option to request to initiate the communication session as an extended reality communication session.

3. The method of claim 1, wherein the communication session of the extended reality communication type includes a whiteboarding session in which the first user interacts with the 3D representation of the second avatar to jointly manipulate a 3D representation of a virtual drawing surface included within the 3D representation of the shared virtual space.

4. The method of claim 1, further comprising:
    modifying, by the communication provider system as the 3D representation of the shared virtual space is displayed within the communication interface, the presenting of the communication interface so as to cease displaying the 3D representation of the shared virtual space within the communication interface and to again display the 2D representation of the shared virtual space within the communication interface; and
    ceasing, by the communication provider system, the presenting of the communication session of the extended reality communication type by way of the head-mounted extended reality presentation device.

5. The method of claim 4, further comprising:
    receiving, by the communication provider system during the initiated communication session as the 3D representation of the shared virtual space is displayed within the communication interface, an additional request, by the first user by way of the communication interface, to terminate the initiated communication session; and
    terminating, by the communication provider system in response to the additional request, the initiated communication session of the extended reality communication type with the second user;
    wherein, based on the terminating of the initiated communication session, the communication provider system automatically performs:
        the modifying of the presenting of the communication interface so as to cease displaying the 3D representation of the shared virtual space and to again display the 2D representation of the shared virtual space, and
        the ceasing of the presenting of the communication session of the extended reality communication type by way of the head-mounted extended reality presentation device.

6. The method of claim 4, further comprising:
    determining, by the communication provider system, that the first user moves the first avatar into a predefined area within the shared virtual space;

modifying, by the communication provider system based on the determining that the first user moves the first avatar into the predefined area, the presenting of the communication interface so as to again cease displaying the 2D representation of the shared virtual space within the communication interface and to again display the 3D representation of the shared virtual space within the communication interface;

determining, by the communication provider system, that the first user moves the first avatar out of the predefined area; and modifying, by the communication provider system based on the determining that the first user moves the first avatar out of the predefined area, the presenting of the communication interface so as to again cease displaying the 3D representation of the shared virtual space within the communication interface and to again display the 2D representation of the shared virtual space within the communication interface.

7. The method of claim 1, wherein the 3D representation of the second avatar visible in the 3D representation of the shared virtual space is a representation of a 3D human form.

8. The method of claim 7, wherein the representation of the 3D human form is customized to the second user by overlaying, onto a face of the 3D human form, a likeness of the second user.

9. The method of claim 1, wherein:
the shared virtual space is a virtual office space associated with an organization employing a workforce of employees that includes the first and second users;
the virtual office space is not based on any physical office space used by the organization;
the first user is located at a first physical location remote from any physical office space used by the organization; and
the second user is located at a second physical location remote from the first physical location and from any physical office space used by the organization.

10. The method of claim 1, wherein:
the shared virtual space is a virtual office space associated with an organization employing a workforce of employees that includes the first and second users;
the virtual office space is based on a physical office space used by the organization;
the first user is located at the physical office space used by the organization; and
the second user is located at a physical location remote from the physical office space used by the organization.

11. A system comprising:
a memory storing instructions; and
a processor communicatively coupled to the memory and configured to execute the instructions to:
present, to a first user, a communication interface that displays a two-dimensional ("2D") representation of a shared virtual space from a top view so that both a 2D representation of a first avatar associated with the first user and a 2D representation of a second avatar associated with a second user are visible in the 2D representation of the shared virtual space;
receive, by way of the communication interface, a request by the first user to initiate a communication session of an extended reality communication type with the second user;
initiate, based on the request, the communication session of the extended reality communication type with the second user;
in response to the initiated communication session being of the extended reality communication type, modify the presenting of the communication interface so as to cease displaying the 2D representation of the shared virtual space within the communication interface and to instead display a three-dimensional ("3D") representation of the shared virtual space an immersive view of a portion of the shared virtual space from a perspective of the first avatar so that a 3D representation of the second avatar is visible; and
present the communication session of the extended reality communication type by way of a head-mounted extended reality presentation device configured to be worn by the first user.

12. The system of claim 11, wherein the receiving of the request to initiate the communication session includes:
providing, to the first user, a menu of options corresponding to different communication types, the menu of options including:
a textual messaging option corresponding to a textual messaging communication type,
a voice call option corresponding to a voice call communication type,
a video call option corresponding to a video call communication type, and
an extended reality option corresponding to the extended reality communication type; and
detecting that the first user selects the extended reality option to request to initiate the communication session as an extended reality communication session.

13. The system of claim 11, wherein the communication session of the extended reality communication type includes a whiteboarding session in which the first user interacts with the 3D representation of the second avatar to jointly manipulate a 3D representation of a virtual drawing surface included within the 3D representation of the shared virtual space.

14. The system of claim 11, wherein the processor is further configured to execute the instructions to:
receive, during the initiated communication session as the 3D representation of the shared virtual space is displayed within the communication interface, an additional request, by the first user by way of the communication interface, to terminate the initiated communication session;
terminate, in response to the additional request, the initiated communication session of the extended reality communication type with the second user;
modify, based on the terminating of the initiated communication session, the presenting of the communication interface so as to cease displaying the 3D representation of the shared virtual space within the communication interface and to again display the 2D representation of the shared virtual space within the communication interface; and
cease, based on the terminating of the initiated communication session, the presenting of the communication session of the extended reality communication type by way of the head-mounted extended reality presentation device.

15. The system of claim 11, wherein the processor is further configured to execute the instructions to:
modify, based on a terminating of the initiated communication session, the presenting of the communication interface so as to cease displaying the 3D representation of the shared virtual space within the communication interface and to again display the 2D representation of the shared virtual space within the communication interface;

determine that the first user moves the first avatar into a predefined area within the shared virtual space;

modify, based on the determining that the first user moves the first avatar into the predefined area, the presenting of the communication interface so as to again cease displaying the 2D representation of the shared virtual space within the communication interface and to again display the 3D representation of the shared virtual space within the communication interface;

determine that the first user moves the first avatar out of the predefined area; and modify, based on the determining that the first user moves the first avatar out of the predefined area, the presenting of the communication interface so as to again cease displaying the 3D representation of the shared virtual space within the communication interface and to again display the 2D representation of the shared virtual space within the communication interface.

16. The system of claim 11, wherein the 3D representation of the second avatar visible in the 3D representation of the shared virtual space is a representation of a 3D human form.

17. The system of claim 16, wherein the representation of the 3D human form is customized to the second user by overlaying, onto a face of the 3D human form, a likeness of the second user.

18. The system of claim 11, wherein:
the shared virtual space is a virtual office space associated with an organization employing a workforce of employees that includes the first and second users;
the virtual office space is based on a physical office space used by the organization;
the first user is located at the physical office space used by the organization; and
the second user is located at a physical location remote from the physical office space used by the organization.

19. A non-transitory computer-readable medium storing instructions that, when executed, direct a processor of a computing device to:
present, to a first user, a communication interface that displays a two-dimensional ("2D") representation of a shared virtual space from a top view so that both a 2D representation of a first avatar associated with the first user and a 2D representation of a second avatar associated with a second user are visible in the 2D representation of the shared virtual space;
receive, by way of the communication interface, a request by the first user to initiate a communication session of an extended reality communication type with the second user;
initiate, based on the request, the communication session of the extended reality communication type with the second user;
in response to the initiated communication session being of the extended reality communication type, modify the presenting of the communication interface so as to cease displaying the 2D representation of the shared virtual space within the communication interface and to instead display a three-dimensional ("3D") representation of the shared virtual space an immersive view of a portion of the shared virtual space from a perspective of the first avatar so that a 3D representation of the second avatar is visible; and
present the communication session of the extended reality communication type by way of a head-mounted extended reality presentation device configured to be worn by the first user.

20. The non-transitory computer-readable medium of claim 19, wherein the communication session of the extended reality communication type includes a whiteboarding session in which the first user interacts with the 3D representation of the second avatar to jointly manipulate a 3D representation of a virtual drawing surface included within the 3D representation of the shared virtual space.

* * * * *